US009208114B2

(12) United States Patent
Maeda et al.

(10) Patent No.: US 9,208,114 B2
(45) Date of Patent: Dec. 8, 2015

(54) STORAGE DEVICE, COMPUTER-READABLE RECORDING MEDIUM, AND STORAGE CONTROL METHOD

(75) Inventors: Munenori Maeda, Yokohama (JP); Jun Kato, Kawasaki (JP); Tatsuo Kumano, Kawasaki (JP); Masahisa Tamura, Kawasaki (JP); Ken Iizawa, Yokohama (JP); Yasuo Noguchi, Kawasaki (JP); Toshihiro Ozawa, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 370 days.

(21) Appl. No.: 13/615,836

(22) Filed: Sep. 14, 2012

(65) Prior Publication Data
US 2013/0138893 A1 May 30, 2013

(30) Foreign Application Priority Data
Nov. 30, 2011 (JP) ................. 2011-263010

(51) Int. Cl.
*G06F 13/28* (2006.01)
(52) U.S. Cl.
CPC ................... *G06F 13/28* (2013.01)
(58) Field of Classification Search
USPC ........................................ 711/156, 158, 103
See application file for complete search history.

(56) References Cited

U.S. PATENT DOCUMENTS

| 5,577,240 | A | 11/1996 | Demers et al. | |
|---|---|---|---|---|
| 8,886,899 | B1 * | 11/2014 | Bao | 711/158 |
| 2012/0221810 | A1 * | 8/2012 | Shah et al. | 711/158 |
| 2013/0054875 | A1 * | 2/2013 | Ross et al. | 711/103 |

FOREIGN PATENT DOCUMENTS

| JP | 08-241237 | 9/1996 |
|---|---|---|
| JP | 2005-32270 A | 2/2005 |

OTHER PUBLICATIONS

Jeff Terrace and Michael J. Freedman, "Object Storage on CRAQ, High-throughput chain replication for read-mostly workloads," Princeton University, USENIX Annual Technical Conference, San Diego, CA (Jun. 2009), pp. 1-16.
Robbert van Renesse and Fred B. Schneider, "Chain Replication for Supporting High Throughput and Availability," USENIX Association OSDI '04: 6th Symposium on Operation Systems Design and Implementation (Dec. 5, 2004).
Jeff Terrace et al., "Object Storage on CRAQ, High-throughput chain replication for read-mostly workloads," USENIX Annual Technical Conference, San Diego, CA, pp. 1-16 (Jun. 2009).
Robbert Van Renesse et al., "Chain Replication for Supporting High Throughput and Availability," USENIX Association OSDI' 04, 6th Conference on Symposium on Operation Systems Design and Implementation.
Japanese Office Action mailed May 19, 2015 for corresponding Japanese Patent Application No. 2011-263010, with Partial English Translation, 4 pages.

* cited by examiner

*Primary Examiner* — Jared Rutz
*Assistant Examiner* — Christopher Do
(74) *Attorney, Agent, or Firm* — Fujitsu Patent Center

(57) ABSTRACT

A storage device being one of a plurality of storage devices storing data includes a memory and a processor coupled to the memory. The processor executes determining, when having received a new request and a new priority information during a preparation for an execution of another update processing, whether a new priority indicated by the new priority information is higher than a priority of the update processing in the preparation. The process including canceling the update processing in the preparation when having determines at the determining that the new priority is higher than the priority of the update processing in the preparation. The process includes forwarding the new request and the new priority information to another storage device when having determined at the determining that the new priority is higher than the priority of the update processing in the preparation.

7 Claims, 19 Drawing Sheets

FIG.16

| |
|---|
| STATUS MANAGEMENT TABLE (18d) |
| UPDATE STATUS:<br>(MARK STRENGTH "x", PARENT REPLICA "y", PARENT AGE, CHILD REPLICA NUMBER) |
| AGE |

STORAGE DEVICE, COMPUTER-READABLE RECORDING MEDIUM, AND STORAGE CONTROL METHOD

CROSS-REFERENCE TO RELATED APPLICATION

This application is based upon and claims the benefit of priority of the prior Japanese Patent Application No. 2011-263010, filed on Nov. 30, 2011, the entire contents of which are incorporated herein by reference.
indicating

FIELD

The embodiments discussed herein are related to a storage device, a computer-readable recording medium and a storage control method.

BACKGROUND

A related storage system includes NoSQL such as distributed Key-Value Store (KVS). In this storage system, a known technique arranges replicas, which are replications of data, in a plurality of nodes. A storage system with this technique arranges replicas in a plurality of nodes to prevent data loss due to disk failure or the like. The storage system also permits reading out data from the replicas to distribute access load.

Here, the storage system may demand Strong Consistency, which guarantees consistency of data read out from each replica. An exemplary method to maintain Strong Consistency includes a known technique of chain replication. An exemplary storage system with the chain replication will be described below.

First, an exemplary processing will be described by referring to FIG. 21. This processing is executed by the storage system in the case where a client has issued a Put request. FIG. 21 is a block diagram illustrating an exemplary chain replication. FIG. 21 illustrates a storage system with CRAQ (Chain Replication with Apportioned Query) as an exemplary chain replication.

The exemplary storage system in FIG. 21 includes N nodes, which have the same replicas. In FIG. 21, nodes other than a first node, a second node, a third node, and an Nth node among the N nodes are omitted in the exemplary storage system.

Each node in the storage system sequentially forwards an update request, which requests to write data, along a route with the nodes arranged in order in the case where the client has issued the Put request. For example, the exemplary storage system in FIG. 21 specifies the first node, which is a starting end of the route, as an issuance destination of the Put request. In this case, the client issues the Put request to the first node, which is a starting end of the route, as illustrated by (A) in FIG. 21.

The first node prepares to write new data and transmits the update request to the second node in the case where the first node has received the Put request as illustrated by (B) in FIG. 21. The second node prepares to write the new data and forwards the update request to the third node in the case where the second node has received the update request from the first node.

Then, each node sequentially forwards the update request until the Nth node, which is a terminating end of the route, receives the update request. As illustrated by (C) in FIG. 21, the Nth node, which is the terminating end of the route, writes the new data and transmits an updated request, which is a response to the update request, to the node immediately before the Nth node in the case where the Nth node has received the update request.

Then, each node writes prepared data and sequentially forwards the updated request along the route up to the first node, which is the starting end, in the case where the node has received the updated request. Then, the first node writes prepared data and notifies the client of completion of the data writing processing in the case where the first node has received the updated request as illustrated by (D) in FIG. 21.

Non-Patent Literature 1: Object Storage on CRAQ, High-throughput chain replication for read-mostly workloads, Jeff Terrace and Michael J. Freedman Princeton University, USENIX annual Technical Conference. San Diego, Calif., June 2009.

Non-Patent Literature 2: Chain Replication for Supporting High Throughput and Availability, Robbert van Renesse, Fred B. Schneider, USENIX Association OSDI '04: 6th Symposium on Peration Systems Design and Implementation.

However, the chain replication technique preliminarily determines nodes to be issuance destinations of the Put request. The problem arises in that the chain replication technique is not able to issue the Put request to an arbitrary node. In view of this, a storage system that distributes installation location of nodes does not equally execute processings in response to Put requests issued by a plurality of clients.

FIG. 22 is a block diagram illustrating a timing at which a received Put request is processed. In an example in FIG. 22, a client $8a$ and a first node are installed in a data center #1 while a client $8b$ is installed in a data center #2. In the example illustrated in FIG. 22, a Put request issued by the client $8a$ arrives at the first node 2 msec after being issued due to network delay while a Put request issued by the client $8b$ arrives at the first node 25 msec after being issued due to network delay.

Here, assume that the client $8a$ issued a Put request 10 msec after the client $8b$ issued a Put request. In this case, the first node receives the Put request issued by the client $8a$ in first as illustrated by (E) in FIG. 22. Then, the first node receives the Put request issued by the client $8b$ as illustrated by (F) in FIG. 22. In view of this, the first node executes the Put request later issued by the client $8a$ before the Put request earlier issued by the client $8b$.

SUMMARY

According to an aspect of the embodiments, a storage device is one of a plurality of storage devices storing data. The storage device includes a memory and a processor coupled to the memory. The processor executes a process including receiving a request for an update processing of the data and a priority information indicating a priority of the update processing. The process includes determining, when having received a new request and a new priority information during a preparation for an execution of another update processing, whether or not a new priority indicated by the new priority information is higher than a priority of the update processing in the preparation. The process includes canceling the update processing in the preparation when having determined at the determining that the new priority is higher than the priority of the update processing in the preparation. The process includes forwarding the new request and the new priority information to another storage device storing the data when having determined at the determining that the new priority is higher than the priority of the update processing in the preparation.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 16 is a table illustrating a status management table according to the second embodiment;

DESCRIPTION OF EMBODIMENTS

Preferred embodiments will be explained with reference to accompanying drawings.

[a] First Embodiment

Figure 1:
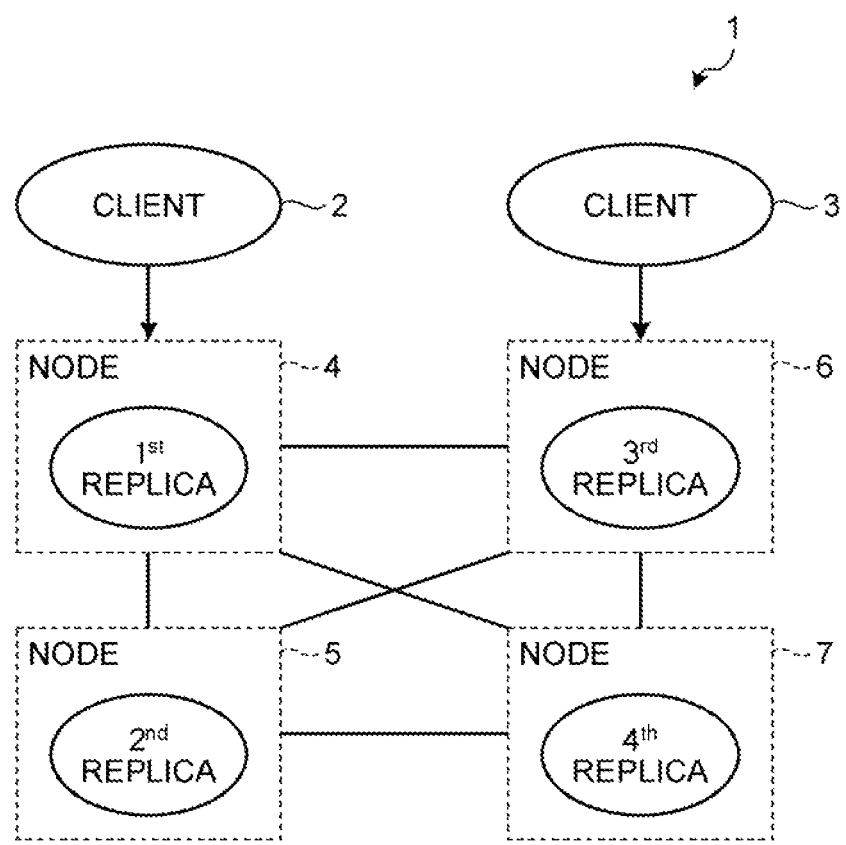
FIG. 1 is a block diagram illustrating a storage system according to a first embodiment.

In a first embodiment below, an exemplary storage system will be described by referring to FIG. 1. FIG. 1 is a block diagram illustrating a storage system according to the first embodiment. In the following description, a node employs a storage device, a server, or the like, which has, for example, a storage and an arithmetic processing unit. The storage stores a replica, which means replicated data. The arithmetic processing unit executes a processing that communicates with other nodes, a processing that updates data, and a processing that maintains data.

In the example illustrated in FIG. 1, a storage system 1 has a plurality of clients 2 and 3. The storage system 1 also has a plurality of nodes 4 to 7. The respective nodes 4 to 7 store a corresponding replica among a first replica to a fourth replica, which are replicated from the same data. In the example illustrated in FIG. 1, the node 4 stores the first replica, the node 5 stores the second replica, the node 6 stores the third replica, and the node 7 stores the fourth replica.

In the example illustrated in FIG. 1, the clients 2 and 3 issue Put requests to any node among the nodes 4 to 7 so as to request an update processing such as data writing. The clients 2 and 3 issue Put requests that include mark strength indicative of priority of the update processing corresponding to the Put request. The clients 2 and 3 also issue Get requests, which request data reading, to the respective nodes 4 to 7.

For example, the clients 2 and 3 issue requests that include mark strength, update operation tags, and data. Here, mark strength is information indicative of execution strength of the processing corresponding to a request, that is, information indicative of priority of processing corresponding to a request. For example, the mark strength is indicative of a time at which the clients 2 and 3 issued requests. The update operation tag is indicative of processing content corresponding to a request. For example, "Put" indicative of data writing is stored while "Get" indicative of data reading is stored.

That is, the Put request is a request that includes an update operation tag storing "Put". The Get request is a request that includes an update operation tag storing "Get". The data is stored only in the Put request, and is targeted for writing. In the case where the clients 2 and 3 issue the Get request, the respective nodes 4 to 7 execute processings. These processings will not be further elaborated here assuming that the processings are similar to processings executed by the related storage system.

Figure 2:
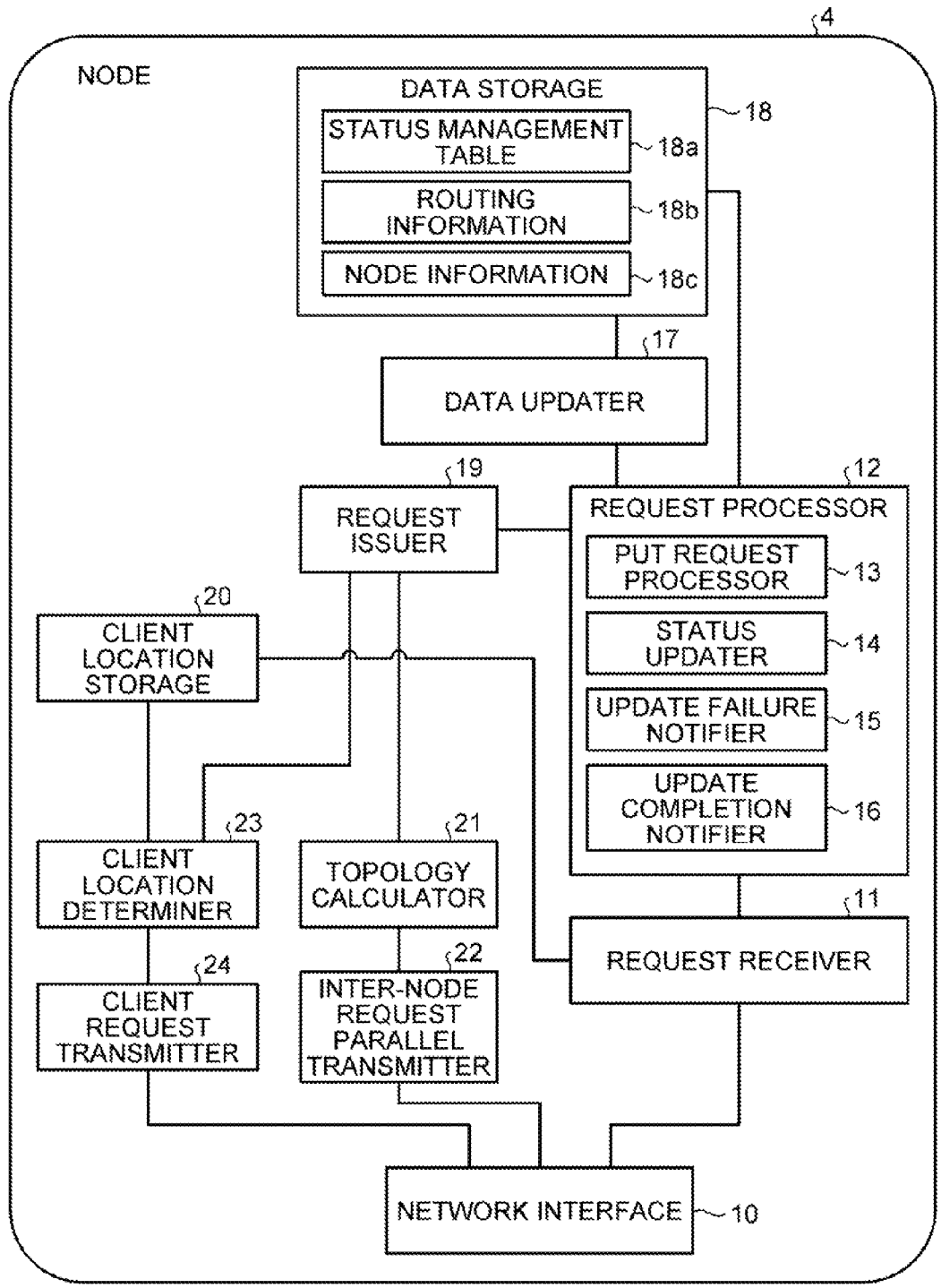
FIG. 2 is a block diagram illustrating a functional configuration of a node according to the first embodiment.

Next, the node 4 will be described using FIG. 2. FIG. 2 is a block diagram illustrating a configuration of functions in a node according to the first embodiment. In the following description, the nodes 5 to 7 will not be further elaborated assuming that the nodes 5 to 7 each have a configuration similar to that of the node 4.

In the example of FIG. 2, the node 4 includes a network interface 10, a request receiver 11, a request processor 12, a data updater 17, a data storage 18, and a request issuer 19. The node 4 also includes a client location storage 20, a topology calculator 21, an inter-node request parallel transmitter 22, a client location determiner 23, and a client request transmitter 24.

The request processor 12 includes a Put request processor 13, a status updater 14, an update failure notifier 15, and an update completion notifier 16. The data storage 18 stores the first replica, and also stores a status management table 18a, routing information 18b, and node information 18c.

Figure 3:
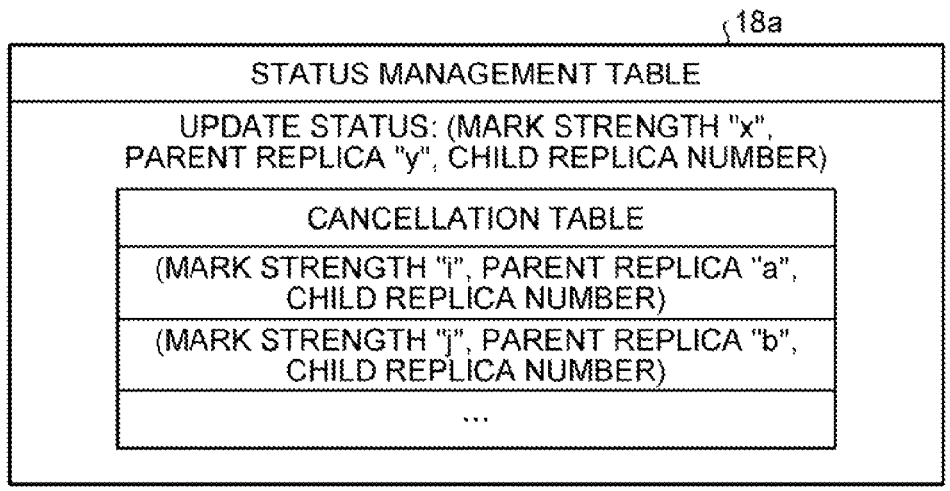
FIG. 3 is a table illustrating an exemplary status management table.

The status management table 18a is a table indicative of a content of an update processing being prepared by the node 4. Here, FIG. 3 is a table illustrating an exemplary status management table. In the example of FIG. 3, the status management table 18a includes an update status and a cancellation table. The update status is indicative of an update processing in preparation. The cancellation table is indicative of an update processing that has been cancelled. Here, the update status stores a mark strength "x", a parent replica "y", and the child replica number.

Here, the "x" means a time at which the client issued the Put request. The "y" is information indicative of a client, which is a transmission origin of the Put request, or a replica, which is a forwarding origin of the Put request.

The child replica number is information indicative of the number of nodes that receives the Put request forwarded by the node 4. For example, in the case where the node 4 forwards the Put request to the node 5, "1" is stored as the child replica number. In the case where the node 4 forwards the Put request to the node 5 and the node 6, "2" is stored as the child replica number. The cancellation table stores the mark strength, the parent replica, and the child replica number of the cancelled update processing.

Returning to FIG. 2, the routing information 18b is indicative of a route where the node 4 forwards the Put request in the case where the node 4 receives the Put request from the clients 2 and 3. For example, the node 4 stores the routing information of G1=({replica 1, replica 2, replica 3, replica 4}, {(replica 1, replica 2), (replica 1, replica 3), (replica 2, replica 4), (replica 4, replica 3)}, replica 1, replica 3).

Here, the routing information includes the replica 1 indicative of the first replica, the replica 2 indicative of the second replica, the replica 3 indicative of the third replica, and the replica 4 indicative of the fourth replica. The routing information includes information of: all replicas to be forwarding destinations of the Put request; collection of combination of replicas to be the forwarding origin of the Put request and replicas to be the forwarding destinations of the Put request; a replica to be the starting end of the route; and a replica to be the terminating end of the route, in this order.

That is, the routing information of G1 in this example indicates that collection of replicas to be the forwarding destinations of the Put request are four replicas of the first replica to the fourth replica. G1 is indicative of a forwarding route to forward the Put request to the node storing the second replica and the node storing the third replica from the node storing the first replica. G1 is also indicative of a forwarding route to: forward the Put request to the node storing the fourth replica from the node storing the second replica; and forward the Put request to the node storing the third replica from the node storing the fourth replica. G1 also indicates that the starting end in the forwarding route of the Put request is the node storing the first replica, and the terminating end of the forwarding route is the node storing the third replica.

The respective nodes 4 to 7 store routing information to forward the Put request and the like for replicas, which are replications of the same data, through the respective routes, which are mutually different, in the same topology. Thus, the respective nodes 4 to 7 store mutually different routing information. For example, the node 6, which stores the third replica, stores routing information of G3=({replica 1, replica 2, replica 3, replica 4}, {(replica 3, replica 1), (replica 3, replica 4), (replica 1, replica 2), (replica 4, replica 2)}, replica 3, replica 2).

The node information 18c is indicative of which node storing the replica of the same data as the first replica stored in the node 4. For example, the node information 18c indicates that the node 5 stores the second replica, the node 6 stores the third replica, and the node 7 stores the fourth replica.

The network interface 10 receives: Put requests transmitted from the clients 2 and 3 and other nodes 5 to 7; update completion notification indicative of success of the update processing; and update failure notification indicative of failure of the update processing. Then, the network interface 10 outputs the received Put requests, the update completion notification, and the update failure notification to the request receiver 11.

The network interface 10 receives the Put requests, the update completion notification, or the update failure notification along with notification of a node to be a transmission destination from the inter-node request parallel transmitter 22. In this case, the network interface 10 transmits the Put requests, the update completion notification, or the update failure notification to the notified node.

The network interface 10 receives the update completion notification or the update failure notification from the client request transmitter 24 along with an IP address of the client and a transaction ID of the Put request. In this case, the network interface 10 transmits the update completion notification or the update failure notification, which are received using the received IP address as a destination.

The request receiver 11 analyzes the Put request, which is received from the network interface 10, and determines whether or not the Put request includes routing information. In the case where the Put request does not include routing information, the request receiver 11 determines that the Put request is issued by the client. Then, the request receiver 11 stores the IP address of the client, which is a transmission origin, and the transaction ID in the client location storage 20. The request receiver 11 outputs the received Put request to a Put request processor 13 in the request processor 12.

On the other hand, in the case where the received Put request includes routing information, the request receiver 11 determines that the received Put request is forwarded from other nodes 5 to 7, thus directly outputting the Put request to the Put request processor 13. In the case where the request receiver 11 receives the update failure notification from the network interface 10, the request receiver 11 outputs the received update failure notification to the update failure notifier 15. In the case where the request receiver 11 receives the update completion notification, the request receiver 11 outputs the received update completion notification to the update completion notifier 16.

In the case where the request processor 12 is preparing an update processing indicated by another Put request when receiving the Put request, the request processor 12 compares mark strength that is stored in the new Put request with mark strength that is stored in the Put request regarding the update processing in preparation. That is, the Put request processor 13 compares priority of the new update processing with priority of the update processing in preparation. In the case where the new update processing has a higher priority than that of the update processing in preparation, the Put request processor 13 cancels the update processing in preparation and forwards the new Put request to other nodes 5 to 7.

Processings executed by the Put request processor 13, the status updater 14, the update failure notifier 15, and the update completion notifier 16 in the request processor 12 will be described below. For example, in the case where the Put request processor 13 receives the Put request, the Put request processor 13 searches a replica targeted for the update processing from the data storage 18. The Put request processor 13 refers to the update status in the status management table 18a so as to determine whether or not any update processing is in preparation.

Then, in the case where the Put request processor 13 determines that no update processing is in preparation, the Put request processor 13 determines whether or not the node 4 is set as a terminating end in a route indicated by the routing information stored in the Put request. In the case where the Put request does not include routing information, that is, in the case where the Put request processor 13 receives the Put request from the clients 2 and 3, the Put request processor 13 obtains the routing information 18b of the replica targeted for the Put request from the data storage 18. Then, the Put request processor 13 determines whether or not the node 4 is set as a terminating end in the route indicated by the routing information 18b.

In the case where the Put request processor 13 determines that the node 4 is set as a terminating end, the Put request processor 13 outputs the Put request to the update completion notifier 16. In the case where the Put request processor 13 determines that the node 4 is not set as a terminating end, the Put request processor 13 outputs the Put request to the status updater 14.

In the case where the Put request processor 13 determines that an update processing is in preparation, the Put request processor 13 executes the following processing. That is, the Put request processor 13 obtains the routing information in the Put request or the routing information 18b of the replica targeted for the Put request from the data storage 18, and then determines whether the node 4 becomes a terminating end.

The Put request processor 13 refers to the update status in the status management table 18a, and then compares the mark strength indicated by the update status with the mark strength in the newly received Put request. That is, the Put request processor 13 compares the priority of the update processing in preparation with the priority of the newly received Put request.

In the case where the Put request processor 13 determines that the node 4 is not a terminating end, and the priority of the new Put request is higher than the priority of the update processing in preparation, the Put request processor 13 outputs the Put request to the status updater 14. In the case where the Put request processor 13 determines that the node 4 is a terminating end, and the priority of the new Put request is higher than the priority of the update processing in preparation, the Put request processor 13 outputs the Put request to the update completion notifier 16. In the case where the Put request processor 13 determines that the priority of the newly received Put request is higher than the priority of the update processing in preparation, the Put request processor 13 outputs the Put request to the update failure notifier 15.

For example, in the case where a time at which the clients 2 and 3 issued the Put request is set to the mark strength, the Put request processor 13 determines that the Put request including an earlier time has higher priority. That is, the Put request processor 13 determines that the priority of the Put request issued earlier is higher than the priority of the Put request issued later.

In the case where the Put request processor 13 outputs the Put request to the status updater 14, the update failure notifier 15, and the update completion notifier 16, the Put request processor 13 executes the following processing. That is, in the case where the Put request processor 13 receives the Put request from the clients 2 and 3, the Put request processor 13 stores the routing information 18b obtained from the data storage 18 in the Put request and then outputs the Put request storing the routing information 18b. That is, the Put request processor 13 outputs the pieces of routing information stored in the other nodes 5 to 7 or the Put request storing the routing information 18b in the data storage 18.

In the case where the Put request processor 13 receives the update failure notification, the Put request processor 13 outputs the update failure notification to the update failure notifier 15. In the case where the Put request processor 13 receives the update completion notification, the Put request processor 13 outputs the update completion notification to the update completion notifier 16.

In the case where the status updater 14 receives the Put request from the Put request processor 13, the status updater 14 executes the following processing. That is, the status updater 14 updates the status management table 18a corresponding to the update processing indicated by the received Put request. Specifically, the status updater 14 determines whether or not the status management table 18a stores the update status. Then, in the case where the status management table 18a stores the update status, the status updater 14 moves content of the update status to the cancellation table.

The status updater 14 obtains mark strength and routing information from the obtained Put request. The status updater 14 uses the obtained routing information to identify a node that has transmitted the Put request to the node 4, that is, a node storing the parent replica. In the case where the obtained routing information stores the replica stored in the node 4 as a starting end, the status updater 14 identifies the client that has issued the Put request. The status updater 14 uses the obtained routing information to identify the number of nodes to forward the Put request, that is, the child replica number.

Then, the status updater 14 stores the obtained mark strength, the identified parent replica or client, and the identified child replica number in the status management table 18a as a new update status. The status updater 14 outputs the Put request to the request issuer 19.

In the case where the update failure notifier 15 receives the Put request from the Put request processor 13, the update failure notifier 15 executes the following processing. First, the Put request processor 13 uses the routing information stored in the received Put request to determine whether a transmission origin of the received Put request is the client or the node storing the parent replica.

In the case where the transmission origin of the received Put request is the node storing the parent replica, the update failure notifier 15 identifies a node that is the transmission origin of the Put request. Then, the update failure notifier 15 requests the request issuer 19 to transmit the update failure notification to the identified node. In this case, the update failure notifier 15 outputs the stored routing information in the Put request to the request issuer 19.

On the other hand, in the case where the transmission origin of the Put request is the client, the update failure notifier 15 identifies a client that is the transmission origin of the Put request. Then, the update failure notifier 15 requests the request issuer 19 to transmit the update failure notification to the identified client.

In the case where the update failure notifier 15 receives the update failure notification, the update failure notifier 15 executes the following processing. First, the update failure notification stores mark strength of the failed update processing and routing information stored in a Put request that requests the failed update processing as described below. Then, the update failure notifier 15 obtains the mark strength of the failed update processing from the update failure notification, and then compares the obtained mark strength with mark strength of the update status.

Then, in the case where the mark strength obtained from the update failure notification accords with the mark strength of the update status, the update failure notifier 15 executes the following processing. First, the update failure notifier 15 sets an update failure flag to the update status, and then decrements the child replica number of the update status by one.

Here, the update failure flag is any information indicative of the failed update processing that is indicated by the update status.

Next, the update failure notifier 15 determines whether or not the child replica number of the update status is zero. In the case where the child replica number is zero, the update failure notifier 15 identifies a client or a node that is the forwarding destination of the update failure notification. Then, the update failure notifier 15 requests the request issuer 19 to forward the update failure notification to the identified client or node.

On the other hand, in the case where the mark strength obtained from the update failure notification does not accord with the mark strength of the update status, the update failure notifier 15 refers to each entry in the cancellation table to obtain an entry of mark strength according with the mark strength obtained from the update failure notification. Then, the update failure notifier 15 decrements the child replica number of the obtained entry by one.

Next, in the case where the child replica number of the obtained entry becomes zero, the update failure notifier 15 removes the entry. The update failure notifier 15 identifies a client or a node that is the forwarding destination of the update failure notification, and then requests the request issuer 19 to forward the update failure notification to the identified client or node. In the case where the update failure notifier 15 requests the request issuer 19 to forward the update failure notification, the update failure notifier 15 provides the request issuer 19 with the update failure notification to be forwarded.

In the case where the update completion notifier 16 receives the Put request from the Put request processor 13, the update completion notifier 16 executes the following processing. That is, the update completion notifier 16 requests the data updater 17 to execute update processing indicated by the received Put request. Then, the update completion notifier 16 uses routing information in the received Put request to determine whether the transmission origin of the received Put request is the node storing the parent replica or the client.

Then, in the case where the transmission origin of the received Put request is the node storing the parent replica, the update completion notifier 16 identifies a node that is the transmission origin of the Put request and then requests the request issuer 19 to transmit the update completion notification to the identified node. In this case, the update completion notifier 16 outputs routing information in the Put request to the request issuer 19.

On the other hand, in the case where the transmission origin of the received Put request is the client, the update completion notifier 16 identifies the client that is the transmission origin of the Put request and then requests the request issuer 19 to transmit the update completion notification to the identified client.

In the case where the update completion notifier 16 receives the update completion notification from the Put request processor 13, the update completion notifier 16 executes the following processing. First, the update completion notification includes, similarly to the update failure notification, mark strength of a completed update processing and routing information in the Put request that requests the completed update processing as described below. Then, the update completion notifier 16 obtains the mark strength and the routing information from the update completion notification, and compares the obtained mark strength with the mark strength of the update status.

Then, in the case where the obtained mark strength accords with the mark strength of the update status, the update completion notifier 16 determines whether or not the update failure flag is set to the update status. In the case where the update failure flag is set, the update completion notifier 16 decrements the child replica number of the update status by one. Then, in the case where the child replica number of the update status becomes zero, the update completion notifier 16 identifies a client that forwards the update failure notification or a node storing the parent replica. The update completion notifier 16 requests the request issuer 19 to transmit the update failure notification to the identified client or node.

In the case where the update failure flag is not set to the update status, the update completion notifier 16 decrements the child replica number of the update status by one. Then, in the case where the child replica number of the update status becomes zero, the update completion notifier 16 requests the data updater 17 to update replica.

The update completion notifier 16 clears the update status, and identifies a client that is the forwarding destination of the update completion notification or a node storing the parent replica. Then, the update completion notifier 16 requests the request issuer 19 to forward the update completion notification to the identified client or node. In this case, the update completion notifier 16 outputs the update completion notification, which is received from another node, to the request issuer 19.

On the other hand, in the case where the mark strength obtained from the update completion notification does not accord with the mark strength of the update status, the update completion notifier 16 refers to the respective entries in the cancellation table, so as to obtain an entry with mark strength according with the mark strength obtained from the update completion notification. Then, the update completion notifier 16 decrements the child replica number of the obtained entry by one. Next, in the case where the child replica number of the obtained entry becomes zero, the update completion notifier 16 removes the entry.

Then, the update completion notifier 16 identifies a client or a node that is the forwarding destination of the update failure notification, and then requests the request issuer 19 to transmit the update failure notification to the identified client or node. In the case where the update completion notifier 16 requests the request issuer 19 to transmit the update failure notification, the update completion notifier 16 outputs the routing information in the update completion notification received from another node to the request issuer 19.

Thus, in the case where the update failure flag is set to the update status, the update completion notifier 16 determines that a Put request with higher priority than that of the forwarded Put request has been transmitted to any of the nodes to which the Put request has been forwarded, and determines that the update failure notification has been received. In view of this, in the case where the update completion notifier 16 receives the update completion notification from all nodes to which the Put request is forwarded, the update completion notifier 16 requests update of replicas and transmits the update completion notification to the client or the node storing the parent replica.

In the case where the update completion notifier 16 receives the update failure notification from any of nodes to which the Put request is forwarded, and receives the update completion notification or the update failure notification from all nodes to which the Put request is forwarded, the update completion notifier 16 executes the following processing. That is, the update completion notifier 16 transmits the update failure notification to the client or the node storing the parent replica, without requesting update of replicas. In the case where the update completion notifier 16 receives the update completion notification or the update failure notification from the nodes to which the Put request is forwarded after cancelling the update processing in preparation, the update completion notifier 16 transmits the update failure notification to the client or the node storing the parent replica.

The data updater 17 updates data of a replica in the data storage 18. Specifically, in the case where the update completion notifier 16 requests the data updater 17 to update the replica, the data updater 17 executes an update processing indicated by the update status.

In the case where the request issuer 19 receives the Put request from the status updater 14, the request issuer 19 forwards the Put request to the other nodes 5 to 7 in accordance with the routing information in the Put request. Specifically, the request issuer 19 outputs the Put request, which is received from the status updater 14, to the topology calculator 21.

In the case where the update failure notifier 15 requests the request issuer 19 to transmit the update failure notification to the client, the request issuer 19 generates the update failure notification. Then, the request issuer 19 outputs the generated update failure notification to the client location determiner 23, and notifies the client identified by the update failure notifier 15.

On the other hand, in the case where the update failure notifier 15 requests the request issuer 19 to transmit the update failure notification to the node, the request issuer 19 generates the update failure notification and includes the routing information received from the update failure notifier 15 in the update failure notification. Then, the request issuer 19 outputs the generated update failure notification to the topology calculator 21.

In the case where the update completion notifier 16 requests the request issuer 19 to transmit the update failure notification, the request issuer 19 executes a processing similar to that executed in the case where the update failure notifier 15 requests the request issuer 19 to transmit the update failure notification. That is, the request issuer 19 generates the update failure notification, and outputs the generated update failure notification to the topology calculator 21 or the client location determiner 23.

In the case where the request issuer 19 receives the update failure notification from the update failure notifier 15 and is requested to forward the update failure notification to the client identified by the update failure notifier 15, the request issuer 19 executes the following processing. That is, the request issuer 19 outputs the received update failure notification to the client location determiner 23, and notifies the client identified by the update failure notifier 15.

In the case where the request issuer 19 receives the update failure notification from the update failure notifier 15 and is requested to forward the update failure notification to the node identified by the update failure notifier 15, the request issuer 19 executes the following processing. That is, the request issuer 19 outputs the received update failure notification to the topology calculator 21.

In the case where the update completion notifier 16 requests the request issuer 19 to transmit the update completion notification to the client, the request issuer 19 generates the update completion notification. Then, the request issuer 19 outputs the generated update completion notification to the client location determiner 23, and notifies the client identified by the update completion notifier 16.

In the case where the update completion notifier 16 requests the request issuer 19 to transmit the update completion notification to the node, the request issuer 19 generates the update completion notification, and stores the routing information received from the update completion notifier 16 in the update completion notification. Then, the request issuer 19 outputs the generated update completion notification to the topology calculator 21.

In the case where the request issuer 19 receives the update completion notification from the update completion notifier 16 and is requested to forward the update completion notification to the client identified by the update completion notifier 16, the request issuer 19 executes the following processing. That is, the request issuer 19 outputs the received update completion notification to the client location determiner 23, and notifies the client identified by the update completion notifier 16.

In the case where the request issuer 19 receives the update completion notification from the update completion notifier 16 and is requested to forward the update completion notification to the node identified by the update completion notifier 16, the request issuer 19 executes the following processing. That is, the request issuer 19 outputs the received update completion notification to the topology calculator 21.

The client location storage 20 stores an IP address of the client that has issued the Put request to the node 4 and a transaction ID of the Put request. Specifically, in the case where the client 2 has issued the Put request to the node 4, the client location storage 20 obtains the IP address of the client 2 from the request receiver 11 and then stores the obtained IP address.

In the case where the topology calculator 21 receives the Put request from the request issuer 19, the topology calculator 21 uses the routing information in the received Put request to identify a node to which the node 4 transmits the Put request. Then, the topology calculator 21 outputs the received Put request to the inter-node request parallel transmitter 22, and requests to transmit the Put request to the identified node.

In the case where the topology calculator 21 receives the update failure notification from the request issuer 19, the topology calculator 21 uses the routing information in the received update failure notification to identify a node to which the node 4 transmits the update failure notification. Specifically, the topology calculator 21 traces the route indicated by the routing information in the update failure notification in the reverse direction, and identifies the node that has transmitted the Put request to the node 4. Then, the topology calculator 21 outputs the received update failure notification to the inter-node request parallel transmitter 22, and requests to transmit the update failure notification to the identified node.

In the case where the topology calculator 21 receives the update completion notification from the request issuer 19, the topology calculator 21 executes a processing similar to the processing executed in the case where the topology calculator 21 receives the update failure notification. Then, the topology calculator 21 identifies the node to transmit the update completion notification. Then, the topology calculator 21 outputs the received update completion notification to the inter-node request parallel transmitter 22, and requests to transmit the update completion notification to the identified node.

For example, in the case where the Put request includes the above-described routing information G1, the topology calculator 21 identifies the node 5, which stores the second replica, and the node 6, which stores the third replica, as nodes to transmit the Put request. In this case, the topology calculator 21 requests the inter-node request parallel transmitter 22 to transmit the Put request to the node 5 and the node 6.

For example, in the case where the Put request includes the above-described routing information G3, the topology calculator 21 identifies the node 5, which stores the second replica, as a node to transmit the Put request. In this case, the topology calculator 21 requests the inter-node request parallel transmitter 22 to transmit the Put request to the node 5.

For example, in the case where the update failure notification includes the above-described routing information G3, the topology calculator 21 analyzes collection of combination of: replicas to be forwarding origins of the Put request; and replicas to be forwarding destinations, in the routing information G3. Then, the topology calculator 21 determines that the node 6 storing the third replica transmits the Put request to the node 4 storing the first replica. In view of this, the topology calculator 21 determines that the transmission destination of the update failure notification is the node 6, and then requests the inter-node request parallel transmitter 22 to transmit the update failure notification to the node 6.

Similarly, in the case where the update completion notification includes the above-described routing information G3, the topology calculator 21 identifies the node 6 storing the third replica as the transmission destination of the update completion notification. In this case, the topology calculator 21 requests the inter-node request parallel transmitter 22 to transmit the update completion notification to the node 6.

The inter-node request parallel transmitter 22 transmits the Put request, the update failure notification, or the update completion notification, which are requested to transmit by the topology calculator 21, to the node identified by the topology calculator 21. For example, in the case where the inter-node request parallel transmitter 22 is requested to transmit the Put request to the node 5, the inter-node request parallel transmitter 22 stores the IP address of the node 5 as a destination in a packet that includes the Put request, thus outputting this packet to the network interface 10.

In the case where the client location determiner 23 receives the update failure notification from the request issuer 19 and also receives notification of the client, the client location determiner 23 executes the following processing. That is, the client location determiner 23 refers to the client location storage 20 so as to obtain an IP address of the notified client and a transaction ID of the Put request. Then, the client location determiner 23 outputs the obtained update failure notification, the obtained IP address, and the obtained transaction ID to the client request transmitter 24.

Similarly, in the case where the client location determiner 23 receives the update completion notification from the request issuer 19 and also receives notification of the client, the client location determiner 23 obtains an IP address of the notified client from the client location storage 20. Then, the client location determiner 23 outputs the obtained update completion notification and the obtained IP address, to the client request transmitter 24.

The client request transmitter 24 transmits the update failure notification and the update completion notification using the IP address of the client, which is obtained from the client location determiner 23, as a destination through the network interface 10. For example, the client request transmitter 24 includes the notified IP address as the destination in a packet storing the update failure notification or the update completion notification, thus outputting the packet to the network interface 10.

For example, the network interface 10, the request processor 12, the Put request processor 13, the status updater 14, the update failure notifier 15, the update completion notifier 16, and the data updater 17 are electronic circuits. In addition, the request issuer 19, the topology calculator 21, the inter-node request parallel transmitter 22, the client location determiner 23, and the client request transmitter 24 are electronic circuits. Here, an exemplary electronic circuit includes an integrated circuit such as an ASIC (Application Specific Integrated Circuit) and an FPGA (Field Programmable Gate Array), CPU (Central Processing Unit), and MPU (Micro Processing Unit).

The data storage 18 and the client location storage 20 are semiconductor memory devices such as a RAM (Random Access Memory), a ROM (Read Only Memory), and a flash memory, or storage devices such as a hard disk and an optical disk.

As described above, the request receiver 11 receives the Put request including mark strength from the clients 2 and 3 or the other nodes 5 to 7. The request processor 12 compares priority of the update processing in preparation with priority of the update processing based on the newly received Put request. In the case where it is determined that the priority of the update processing based on the newly received Put request is higher, the request processor 12 cancels the update processing in preparation. Then, the request processor 12 prepares for the update processing based on the new Put request, and forwards the Put request to the other nodes 5 to 7 in accordance with the routing information stored in the Put request or the routing information 18b stored in the node 4.

In view of this, the storage system 1 appropriately executes the Put request issued to any node. For example, in the case where the node 4 accepts to forward the Put request, which is issued to the node 5, after starting a process of the Put request issued to itself, the node 4 determines which Put request was issued earlier, thus executing the earlier Put request. As a result, the node 4 appropriately executes the Put request issued to any node.

For example, in the case where the client 3 and the node 4 are installed in different data centers while the client 3 and the node 5 are installed in the same data center, the client 3 does not have to issue the Put request to the node 4 storing the first replica. That is, the client 3 does not issue the Put request to the node 4, which is installed in different data center, and the client 3 may issue the Put request to the node 5 in the same data center. Thus, the storage system 1 minimizes latencies between: the clients 2 and 3; and the respective nodes 4 to 7, and equally executes the update processings based on the Put requests issued by the respective clients 2 and 3.

This allows the respective clients 2 and 3 to issue the Put requests to the nearest node. As a result, the storage system 1 makes round-trip times of the Put requests issued by the respective clients 2 and 3 shorter. For example, assume that communication between the client 2 and the node 4 causes latency of 2 msec, communication between the client 3 and the node 4 causes latency of 25 msec, and communication between the client 3 and the node 5 causes latency of 2 msec. In this case, the Put requests issued by the respective clients 2 and 3 have the same round-trip time insofar as the client 2 issues the Put request to the node 4 while the client 3 issues the Put request to the node 5.

For example, the respective clients 2 and 3 establish session to mutually different nodes for the Put request and the Get request in order to issue the Get request to the nearest node in the case where a node that is the issuance destination of the Put request is specified. In view of this, in the case where the issuance destination node of the Put request is specified as the related storage system, two sessions are established among the respective clients and nodes. This consequently increases calculation resources and communication resources for session management. On the other hand, the respective clients 2 and 3 in the storage system 1 issue the Put request to the nearest node, similarly to the Get request. In view of this, the storage system 1 reduces calculation resources and communication resources for session management.

Figure 4:
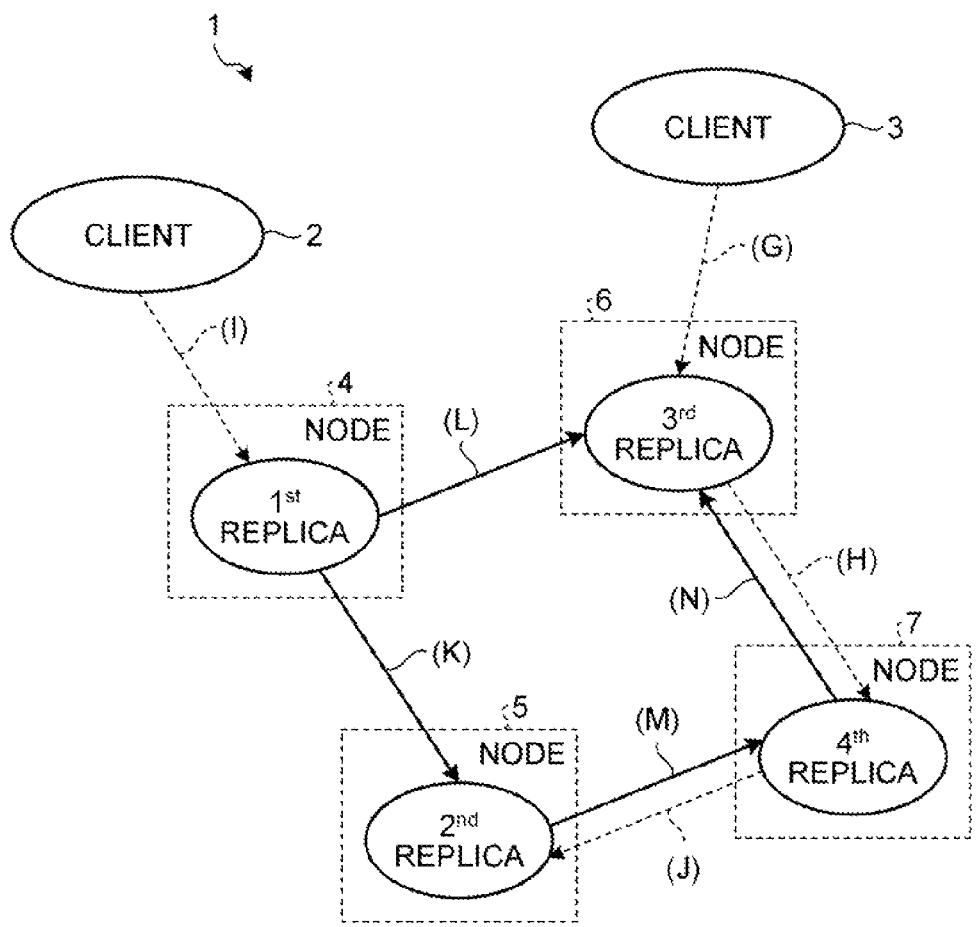
FIG. 4 is a block diagram illustrating a processing by a storage system according to the first embodiment.

Next, an exemplary processing executed by the storage system 1 will be described using FIG. 4. FIG. 4 is a block diagram illustrating a processing executed by a storage system according to the first embodiment. In the example of FIG. 4, assume that the client 2 has issued the Put request before the client 3. In the example of FIG. 4, assume that the node 6 receives the Put request later issued by the client 3, and the node 4 then receives the Put request issued by the client 2 due to network delay.

In the example of FIG. 4, assume that the clients 2 and 3 store times at which the Put requests were issued as mark strength. In the example of FIG. 4, assume that the node 4 stores the routing information G1 while the node 6 stores the routing information G3. In the example of FIG. 4, assume that the respective nodes 4 to 7 determine that priority of the update processing based on the Put request issued earlier is higher.

For example, as illustrated by (G) in FIG. 4, the node 6 receives the Put request from the client 3. In this case, the node 6 prepares for the update processing based on the Put request of the client 3, and forwards the Put request of the client 3 to the node 7 as illustrated by (H) in FIG. 4. Here, as illustrated by (I) in FIG. 4, the node 4 receives the Put request from the client 2.

Next, the node 7 prepares for the update processing based on the Put request of the client 3, and forwards the Put request to the node 5 as illustrate by (J) in FIG. 4. As illustrated by (K) in FIG. 4, the node 4 forwards the Put request of the client 2 to the node 5. The node 4 forwards the Put request of the client 2 to the node 6 as illustrated by (L) in FIG. 4. The node 5 and the node 6 compare the priority of the update processing based on the Put request of the client 2 with the priority of the update processing based on the Put request of the client 3, and determine that the priority of the update processing, which was issued earlier, based on the Put request of the client 2 is higher.

In view of this, the node 5 issues the update failure notification to the node 7 in response to the Put request of the client 2. The node 7 forwards the update failure notification to the node 6. Then the node 6 transmits the update failure notification to the client 3 after receiving the update failure notification from the node 7, which has forwarded the Put request.

The node 5 prepares for the update processing based on the Put request of the client 2, and forwards the Put request of the client 2 to the node 7 as illustrated by (M) in FIG. 4. The node 7 prepares for the update processing based on the Put request of the client 2, and forwards the Put request of the client 2 to the node 6 as illustrated by (N) in FIG. 4.

Then, the node 6 executes the update processing based on the Put request, and transmits the update completion notification to the node 4 and the node 7. In this case, the node 7 executes the prepared update processing, and forwards the update completion notification to the node 5. In the case where the node 5 receives the update completion notification, the node 5 executes the prepared update processing, and forwards the update completion notification to the node 4.

Then, in the case where the node 4 receives the update completion notifications from the node 6 and the node 5, the node 4 executes the prepared update processing, and forwards the update completion notification to the client 2. Thus, even in the case where the Put requests are issued to the mutually different nodes 4 and 6, the storage system 1 executes the update processing only, based on the Put request issued earlier. In view of this, in the case where the storage system 1 issues the Put request to any destination, the storage system 1 appropriately executes the update processing based on the Put request while maintaining Strong Consistency.

In the case where the respective nodes 4 to 7 add the transaction ID to the Put request and transmit update failure notification or update success notification, the respective nodes 4 to 7 may identify association between the Put request and each notification by adding the transaction ID added in the corresponding Put request.

Figure 5:
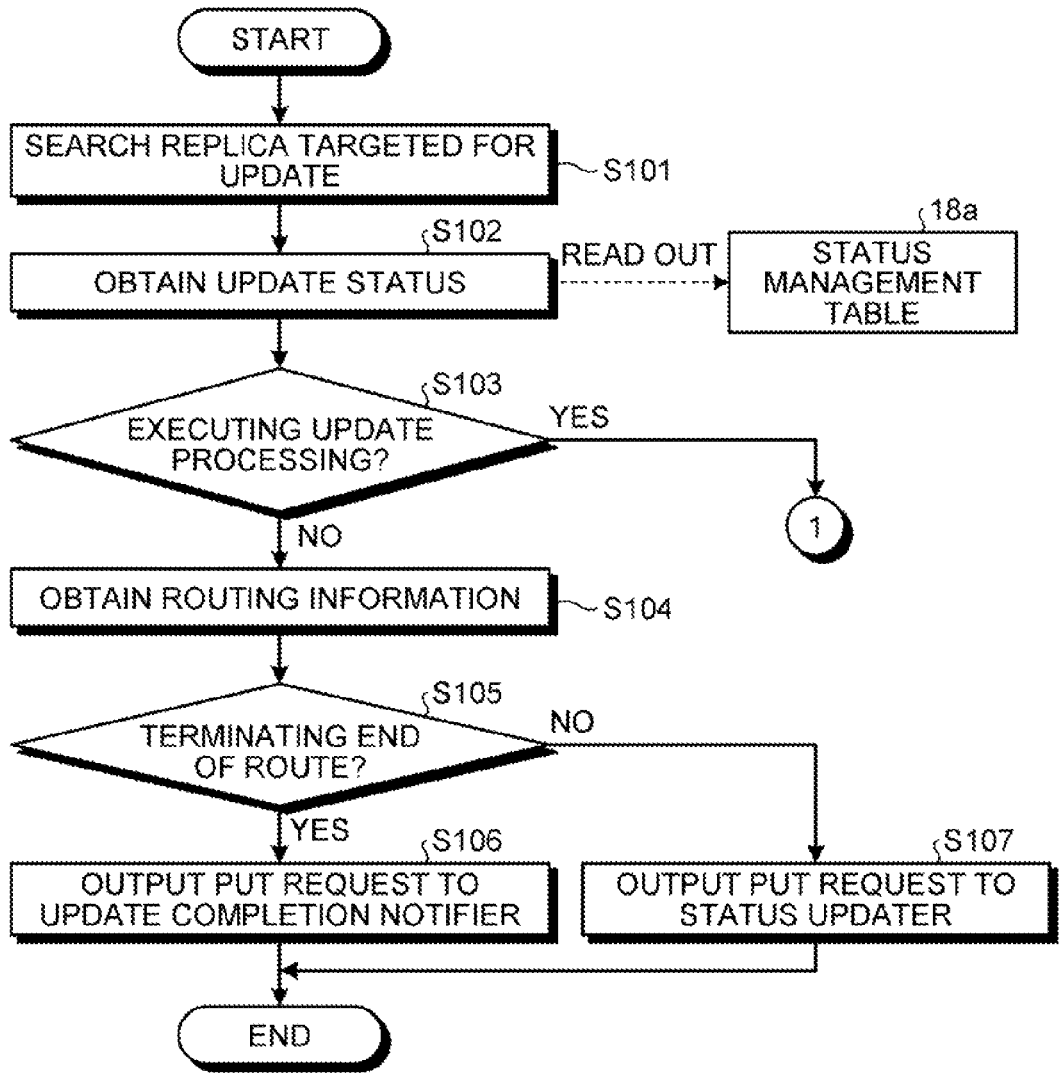
FIG. 5 is a first flowchart of a processing by a node when a Put request is received according to the first embodiment.
Figure 6:
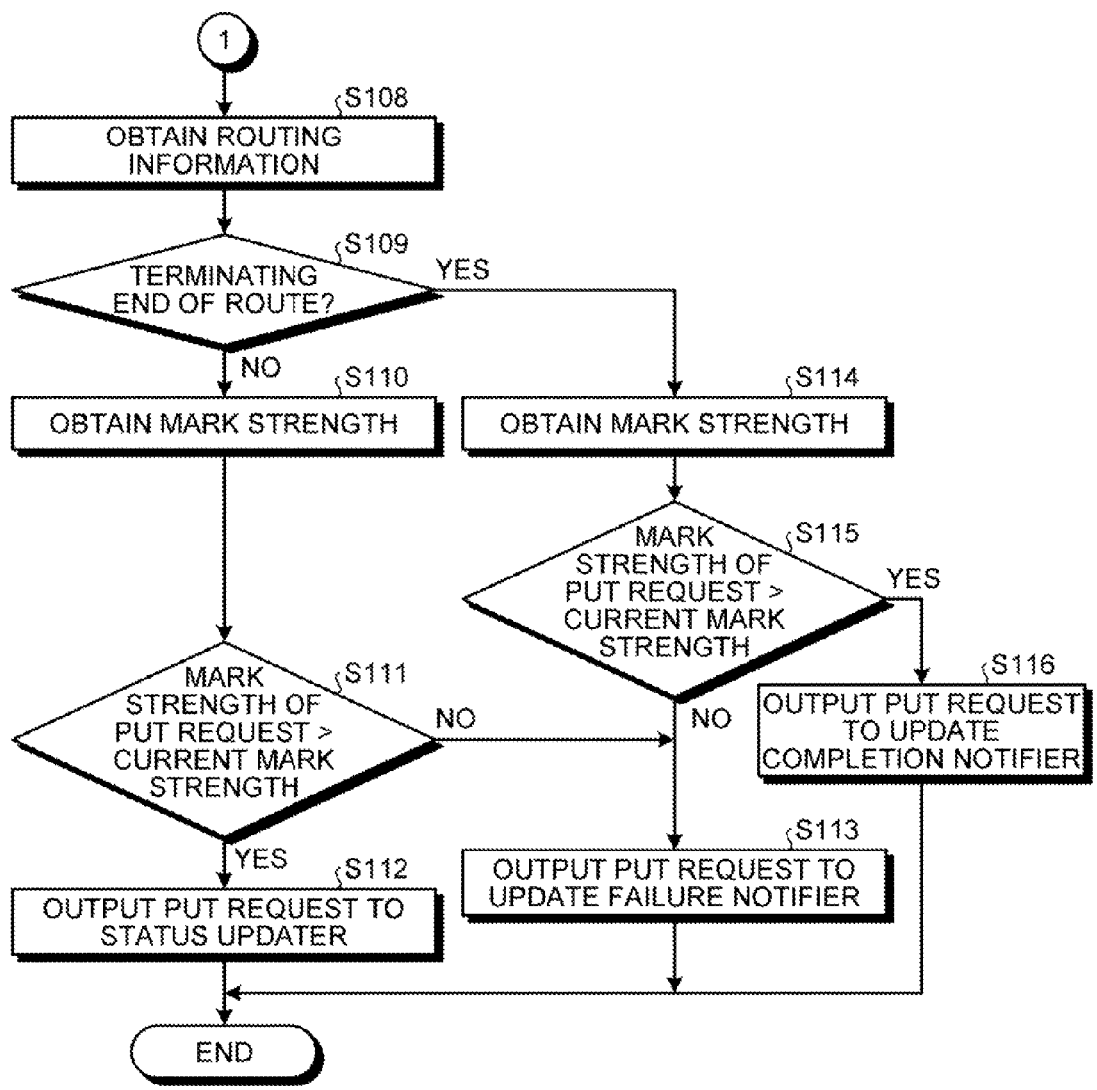
FIG. 6 is a second flowchart of a processing by a node when a Put request is received according to the first embodiment.

Next, a flow of processing executed by the Put request processor 13 when receiving the Put request will be described using FIGS. 5 and 6. FIG. 5 is a first flowchart of a processing executed by a node when receiving a Put request according to the first embodiment. FIG. 6 is a second flowchart of a processing executed by the node when receiving the Put request according to the first embodiment.

For example, the Put request processor 13 executes each processing illustrated in FIG. 5 when receiving the Put request. That is, the Put request processor 13 searches a replica targeted for the update processing based on the Put request in the data storage 18 (step S101). Next, the Put request processor 13 reads out the update status from the status management table 18a (step S102). Then, the Put request processor 13 determines whether or not an update processing based on another Put request is being executed, that is, whether or not the update status stores information of the update processing based on the other Put request (step S103).

In the case where the Put request processor 13 determines that the update processing based on the other Put request is not in preparation (No in step S103), the Put request processor 13 obtains routing information to forward the Put request (step S104). Then, the Put request processor 13 uses the obtained routing information so as to determine whether or not the Put request processor 13 itself is a terminating end of the route (step S105).

In the case where the Put request processor 13 determines that the Put request processor 13 itself is the terminating end of the route (Yes in step S105), the Put request processor 13 outputs the Put request to the update completion notifier 16 (step S106), and then terminates the processing. In the case where the Put request processor 13 determines that the Put request processor 13 itself is not the terminating end of the route (No in step S105), the Put request processor 13 outputs the Put request to the status updater 14 (step S107), and then terminates the processing.

In the case where the Put request processor 13 determines that the update processing based on the other Put request is in preparation (Yes in step S103), the Put request processor 13 executes the processing illustrated in FIG. 6. That is, the Put request processor 13 obtains the routing information to forward the Put request (step S108). Then, the Put request processor 13 uses the obtained routing information to determine whether or not the node 4 is a terminating end (step S109).

In the case where the Put request processor 13 determines that the node 4 is not the terminating end of the route (No in step S109), the Put request processor 13 obtains the current mark strength from the update status and also obtains mark strength from the Put request (step S110). Then, the Put request processor 13 determines whether or not the mark strength of the Put request is larger than the current mark strength (step S111).

In the case where the Put request processor 13 determines that the mark strength of the Put request is larger than the current mark strength (Yes in step S111), the Put request processor 13 outputs the Put request to the status updater 14 (step S112), and then terminates the processing. In the case where the Put request processor 13 determines that the mark strength of the Put request is equal to or less than the current mark strength (No in step S111), the Put request processor 13 outputs the Put request to the update failure notifier 15 (step S113), and then terminates the processing.

In the case where the Put request processor 13 determines the node 4 is the terminating end of the route (Yes in step S109), the Put request processor 13 obtains the current mark strength from the update status and also obtains the mark strength from the Put request (step S114). Then, the Put request processor 13 determines whether or not the mark strength of the Put request is larger than the current mark strength (step S115).

In the case where the Put request processor 13 determines that the mark strength of the Put request is larger than the current mark strength (Yes in step S115), the Put request processor 13 outputs the Put request to the update completion notifier 16 (step S116), and then terminates the processing. In the case where the Put request processor 13 determines that the mark strength of the Put request is equal to or less than the current mark strength (No in step S115), the Put request processor 13 outputs the Put request to the update failure notifier 15 (step S113), and then terminates the processing.

Figure 7:
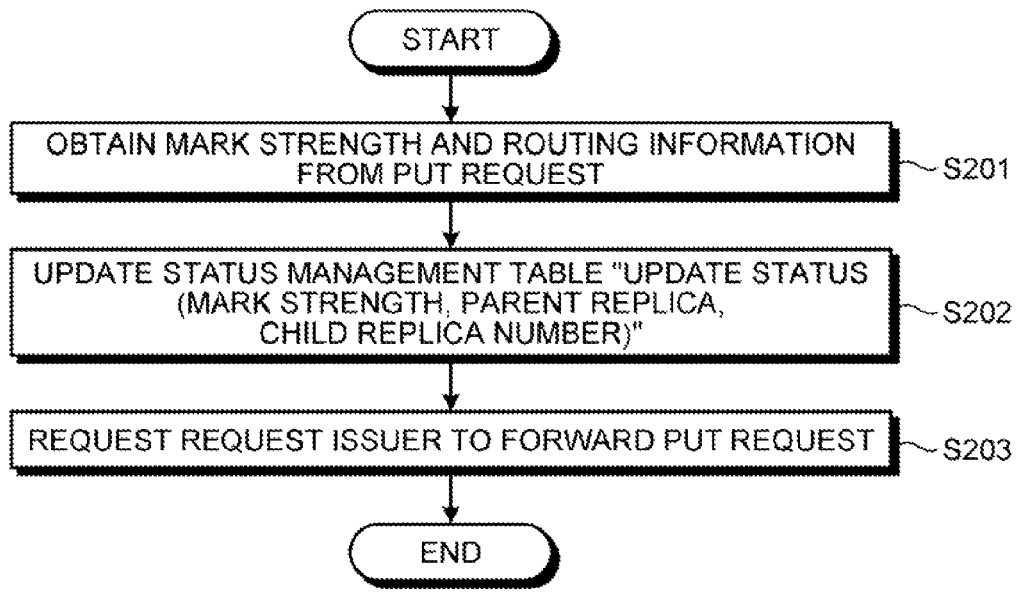
FIG. 7 is a flowchart of a status update processing according to the first embodiment.

Next, a flow of a status update processing executed by the status updater 14 when receiving the Put request will be described using FIG. 7. FIG. 7 is a flowchart of the status update processing according to the first embodiment. For example, in the example of FIG. 7, the status updater 14 starts the status update processing triggered by reception of the Put request.

First, the status updater 14 obtains mark strength and routing information from the Put request (step S201). Next, the status updater 14 updates the update status in the status management table 18*a* according to the obtained mark strength and routing information (step S202). Specifically, the status updater 14 identifies a parent replica and a child replica number based on the obtained routing information, and stores the identified data with mark strength as the update status. Next, the status updater 14 transmits the Put request to the request issuer 19 so as to request to forward the Put request to a node storing the child replica (step S203), and then terminates the processing.

Figure 8:
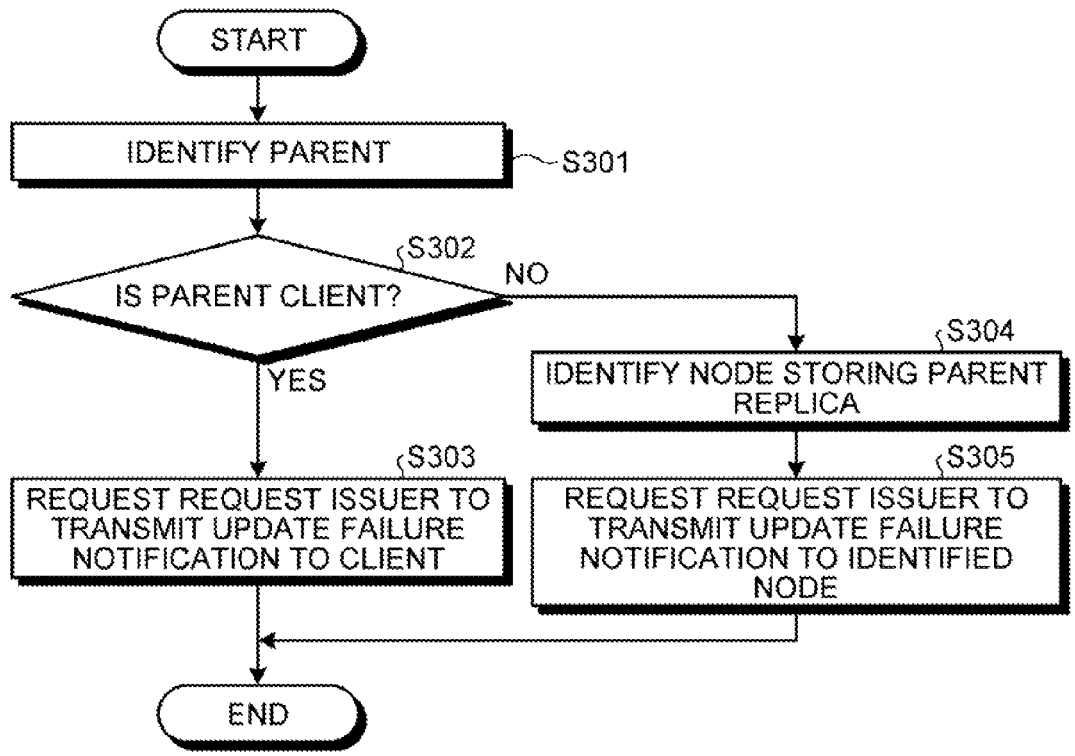
FIG. 8 is a flowchart of an update failure notification processing according to the first embodiment.

Next, a flow of the update failure notification processing executed by the update failure notifier 15 when receiving the Put request will be described using FIG. 8. FIG. 8 is a flowchart of the update failure notification processing according to the first embodiment. For example, in the example of FIG. 8, the update failure notifier 15 starts the update failure notification processing triggered by reception of the Put request.

First, the update failure notifier 15 uses routing information in the Put request to identify a node or a client that transmits the Put request to a parent, that is, the node 4 (step S301). Then, the update failure notifier 15 determines whether or not the parent is a client (step S302).

In the case where the parent is a client (Yes in step S302), the update failure notifier 15 requests the request issuer 19 to transmit the update failure notification to the client (step S303), and then terminates the processing. In the case where the parent is not a client (No in step S302), the update failure notifier 15 identifies a node storing the parent replica (step S304), and requests the request issuer 19 to transmit the update failure notification to the identified node (step S305). Then, the update failure notifier 15 terminates the processing.

Figure 9:
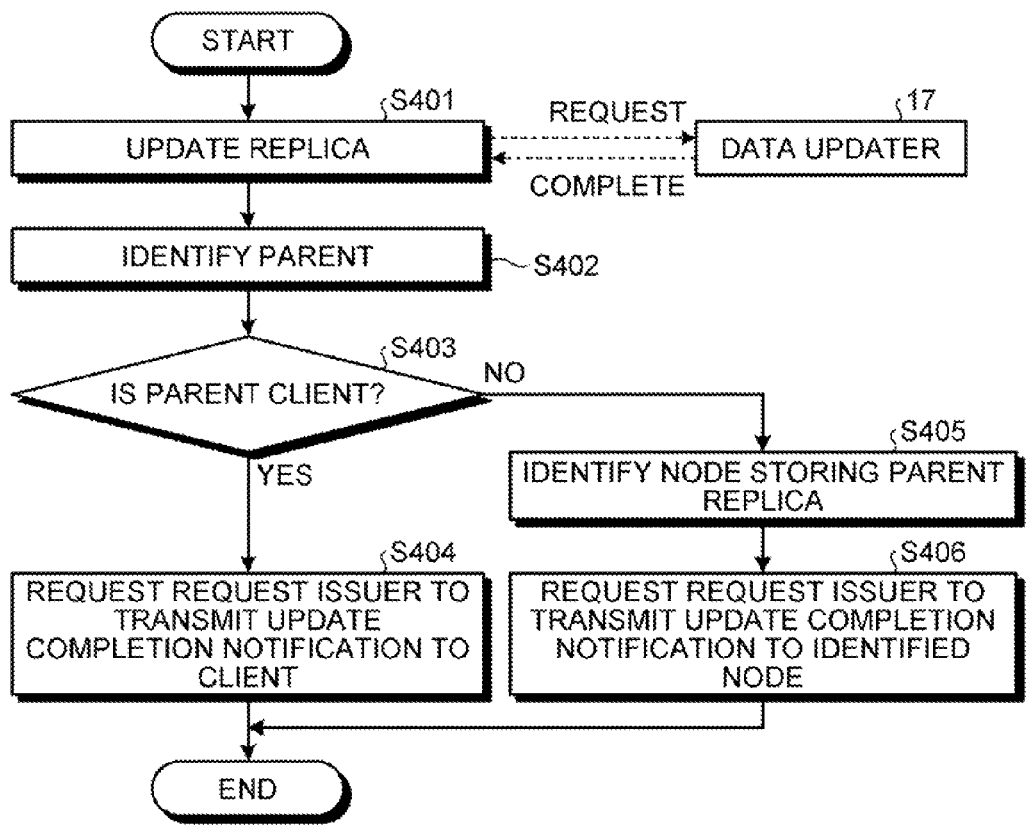
FIG. 9 is a flowchart of an update completion notification processing according to the first embodiment.

Next, a flow of the update completion notification processing executed by the update completion notifier 16 when receiving the Put request will be described using FIG. 9. FIG. 9 is a flowchart of the update completion notification processing according to the first embodiment. For example, in the example of FIG. 9, the update completion notifier 16 starts the update failure notification processing triggered by reception of the Put request.

First, the update completion notifier 16 requests the data updater 17 to update the replica stored in the data storage 18 based on the received Put request (step S401). Then, the update completion notifier 16 identifies a parent node or a parent replica using the routing information (step S402). The update completion notifier 16 determines whether or not the parent is a client (step S403).

In the case where the update completion notifier 16 determines that the parent is a client (Yes in step S403), the update completion notifier 16 requests the request issuer 19 to transmit the update completion notification to the client (step S404), and then terminates the processing. In the case where the update completion notifier 16 determines that the parent is a node (No in step S403), the update completion notifier 16 identifies the node storing the parent replica (step S405), and then requests the request issuer 19 to transmit the update completion notification to the identified node (step S406). Then, the update completion notifier 16 terminates the processing.

Figure 10:
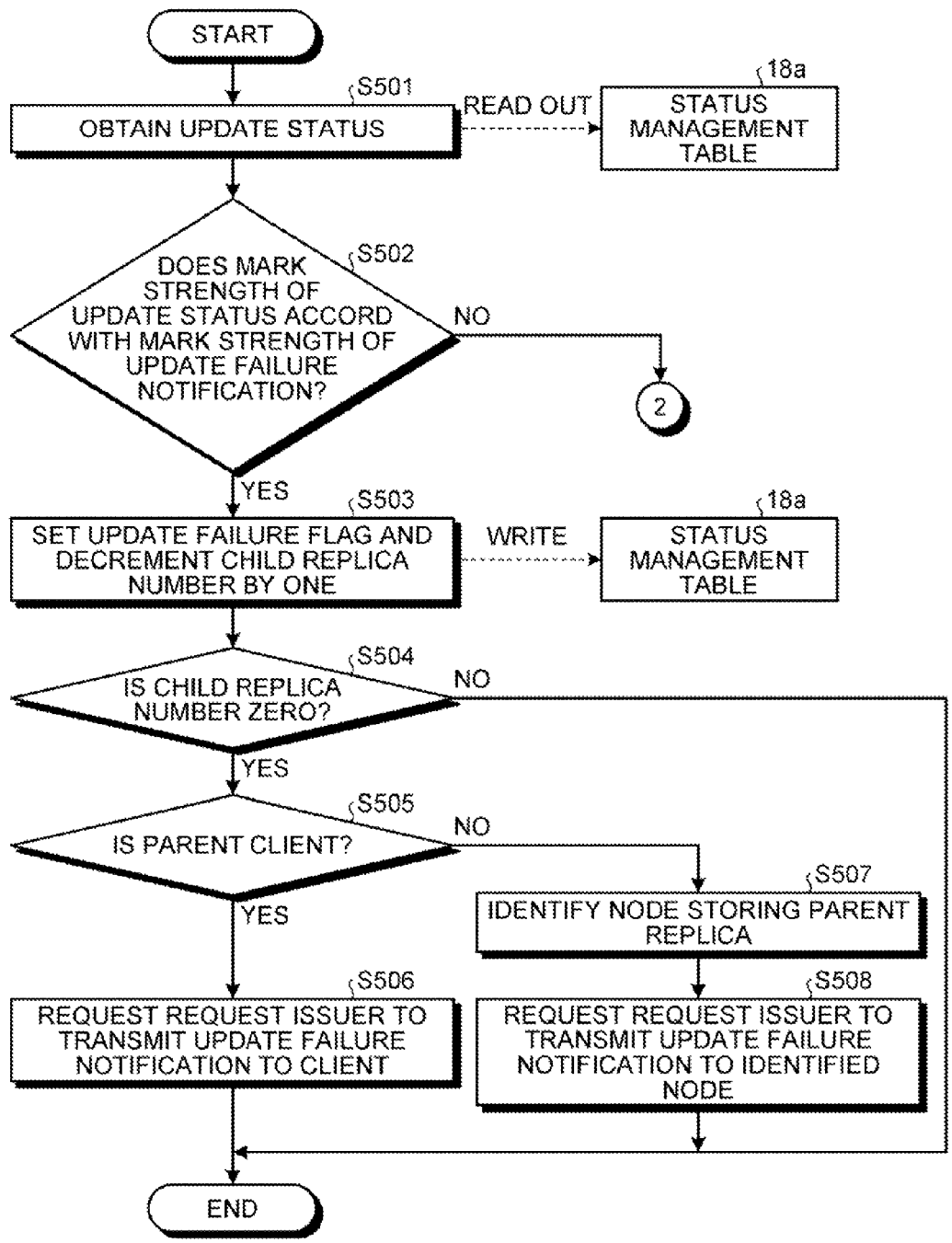
FIG. 10 is a first flowchart of a processing when an update failure notification is obtained.
Figure 11:
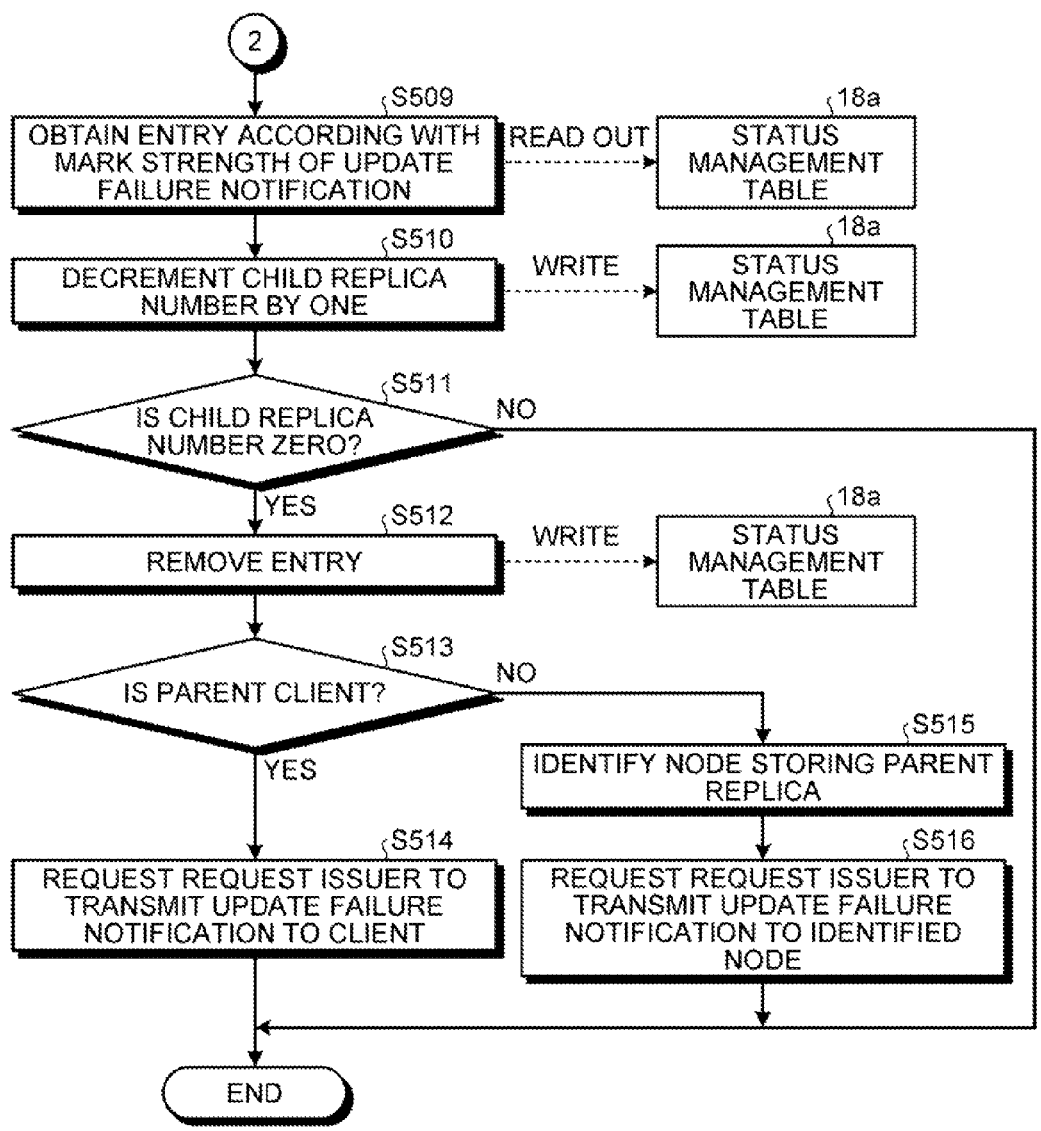
FIG. 11 is a second flowchart of a processing when an update failure notification is obtained.

Next, a flow of a processing executed by the update failure notifier 15 when receiving the update failure notification will be described using FIGS. 10 and 11. FIG. 10 is a first flowchart of the processing executed when the update failure notification is obtained. FIG. 11 is a second flowchart of a processing executed when an update failure notification is obtained. In the example of FIG. 10, the update failure notifier 15 starts the processing triggered by reception of the update failure notification.

First, the update failure notifier 15 reads out the update status from the status management table 18*a* (step S501). Then, the update failure notifier 15 determines whether or not the mark strength of the update status accords with the mark strength of the update failure notification (step S502). Then, in the case where the mark strength of the update status accords with the mark strength of the update failure notification (Yes in step S502), the update failure notifier 15 executes the following processing. That is, the update failure notifier 15 sets the update failure flag in the status management table 18*a* to the update status, and decrements the child replica number of the update status by one (step S503).

Next, the update failure notifier 15 determines whether or not the child replica number of the update status is zero (step S504). In the case where the update failure notifier 15 determines that the child replica number of the update status is zero (Yes in step S504), the update failure notifier 15 executes the following processing. That is, the update failure notifier 15 determines whether or not the parent, which is a transmission origin of the Put request that has requested the failed update processing, is a client (step S505).

Then, in the case where the parent is a client (Yes in step S505), the update failure notifier 15 requests the request issuer 19 to transmit the update failure notification to the client (step S506), and then terminates the processing. In the case where the parent is not a client (No in step S505), the update failure notifier 15 identifies the node storing the parent replica (step S507), and then requests the request issuer 19 to transmit the update failure notification to the identified node (step S508). Then, the update failure notifier 15 terminates the processing. In the case where the update failure notifier 15 determines that the child replica number of the update status is not zero (No in step S504), the update failure notifier 15 terminates the processing.

On the other hand, in the case where the mark strength of the update status does not accord with the mark strength of the update failure notification (No in step S502), the update failure notifier 15 starts the processing illustrated in FIG. 11. That is, the update failure notifier 15 obtains an entry including mark strength according with the mark strength of the update failure notification from the status management table 18a (step S509).

Next, the update failure notifier 15 decrements the child replica number of the obtained entry by one (step S510), and then determines whether or not the child replica number has become zero (step S511). Next, in the case where the update failure notifier 15 determines that the child replica number has become zero (Yes in step S511), the update failure notifier 15 removes the obtained entry from the cancellation table (step S512), and then executes the following processing. That is, the update failure notifier 15 determines whether or not the parent, which is the transmission origin of the Put request that has requested the failed update processing, is a client (step S513).

Then, in the case where the parent is a client (Yes in step S513), the update failure notifier 15 requests the request issuer 19 to transmit the update failure notification to the client (step S514), and then terminates the processing. In the case where the parent is not a client (No in step S513), the update failure notifier 15 identifies the node storing the parent replica (step S515), and then requests the request issuer 19 to transmit the update failure notification to the identified node (step S516). Then the update failure notifier 15 terminates the processing. In the case where the update failure notifier 15 determines that the child replica number of the update status is not zero (No in step S511), the update failure notifier 15 terminates the processing.

Figure 12:
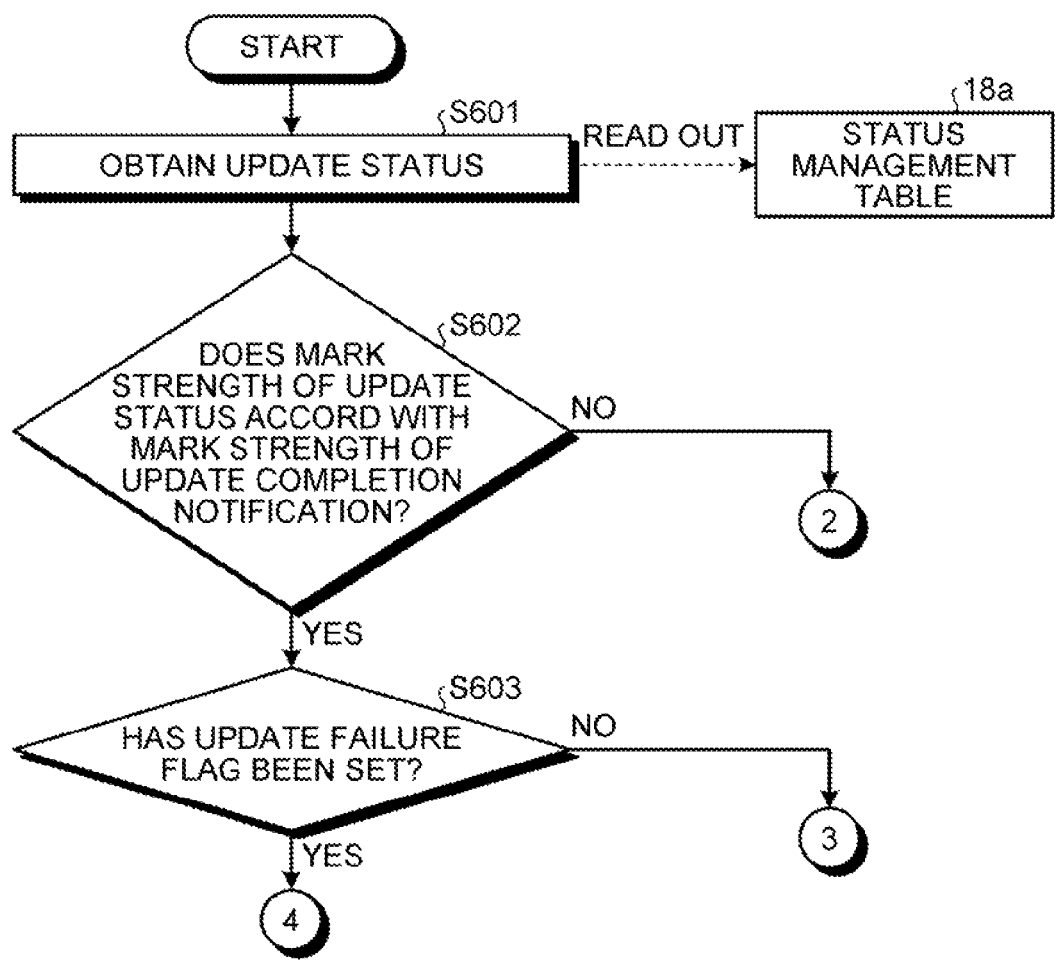
FIG. 12 is a first flowchart of a processing when an update completion notification is obtained.
Figure 13:
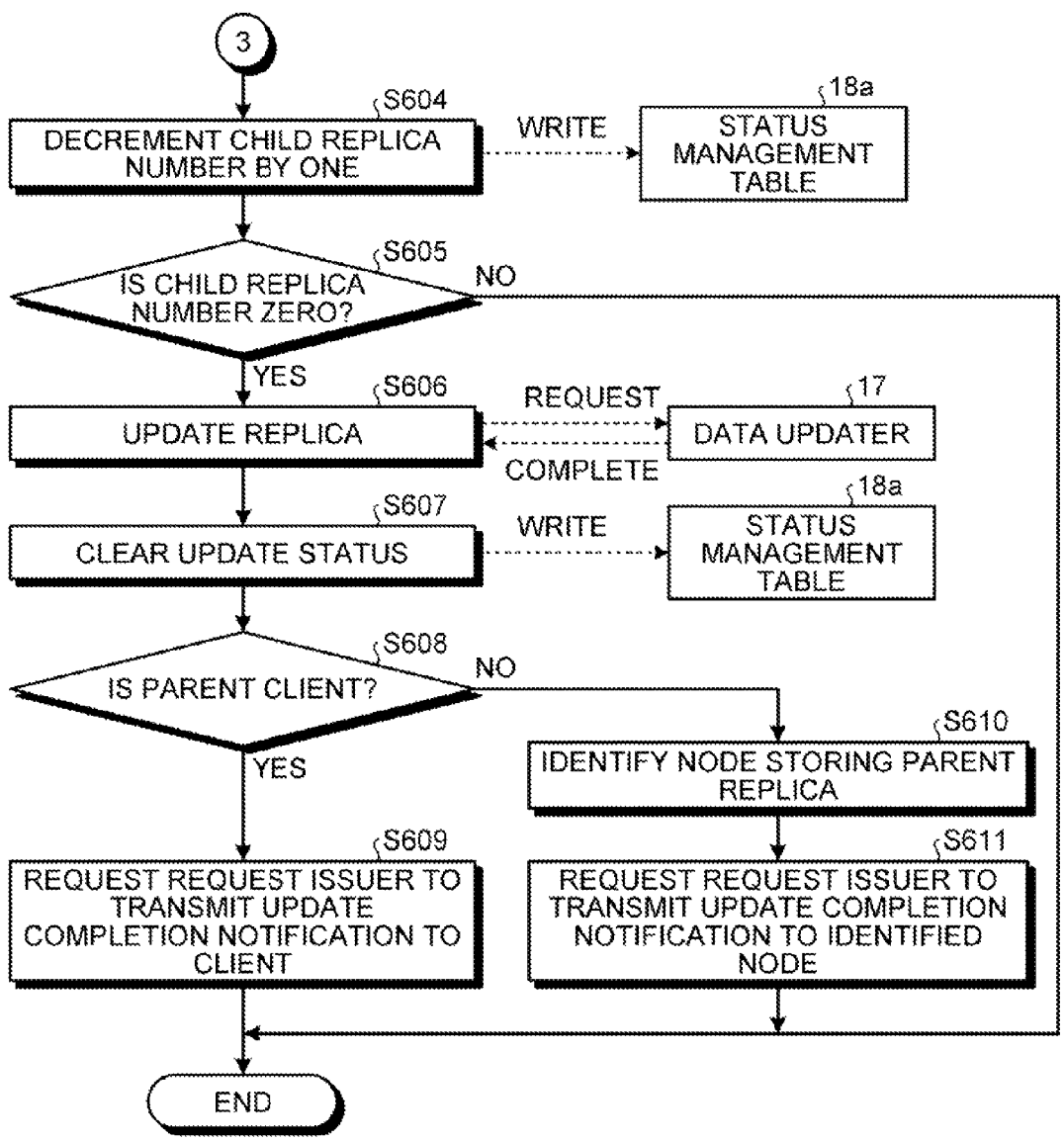
FIG. 13 is a second flowchart of a processing when an update completion notification is obtained.
Figure 14:
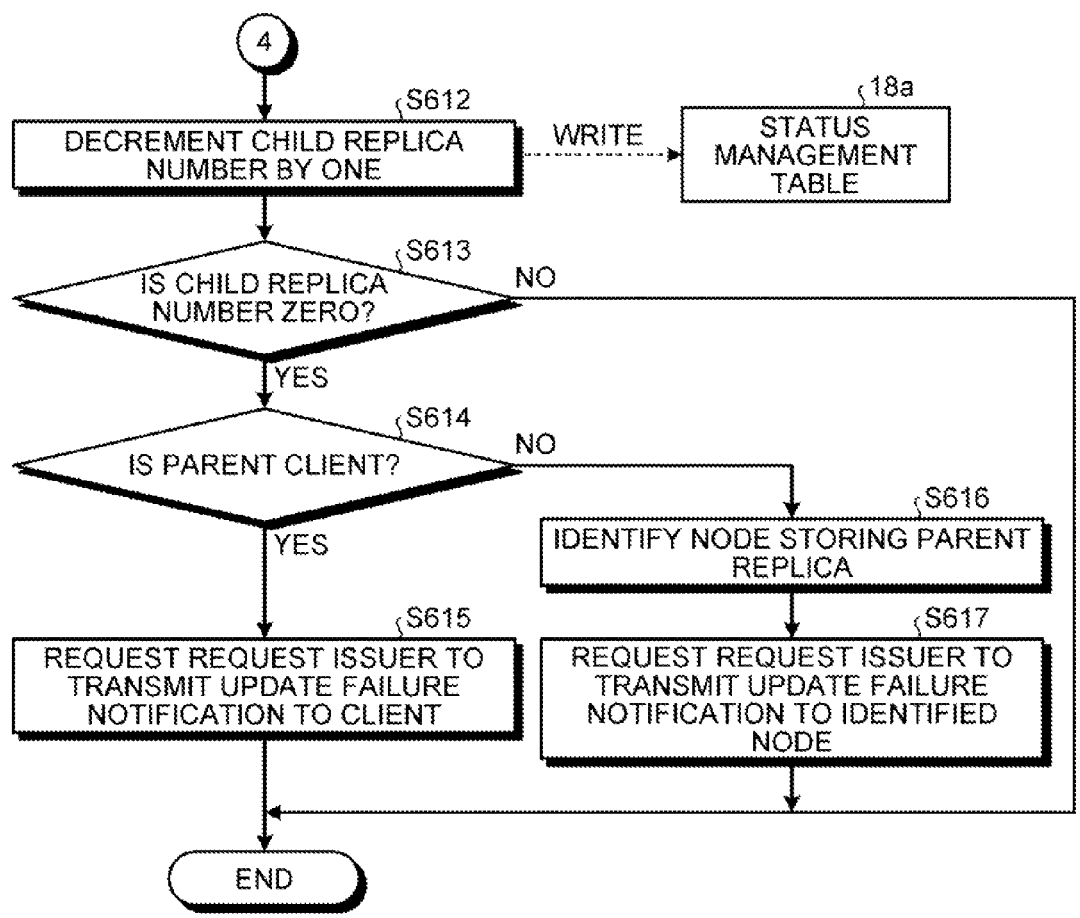
FIG. 14 is a third flowchart of a processing when an update completion notification is obtained.

Next, a flow of a processing executed by the update completion notifier 16 when receiving the update completion notification will be described using FIGS. 12 to 14. FIG. 12 is a first flowchart of the processing executed when the update completion notification is received. FIG. 13 is a second flowchart of the processing executed when the update completion notification is received. FIG. 14 is a third flowchart of the processing executed when the update completion notification is received.

In the example of FIG. 12, the update completion notifier 16 starts the processing triggered by reception of the update completion notification. First, the update completion notifier 16 receives the update status from the status management table 18a (step S601). Next, the update completion notifier 16 determines whether or not the mark strength of the update status accords with the mark strength of the update completion notification (step S602). Then, in the case where the mark strength of the update status does not accord with the mark strength of the update completion notification (No in step S602), the update completion notifier 16 executes the same processing as that of the update failure notifier 15 illustrated in FIG. 11.

On the other hand, in the case where the mark strength of the update status accords with the mark strength of the update completion notification (Yes in step S602), the update completion notifier 16 determines whether or not the update failure flag has been set (step S603).

Here, in the case where the update failure flag has not been set (No in step S603), the update completion notifier 16 executes the processing in FIG. 13. That is, the update completion notifier 16 decrements the child replica number of the update status in the status management table 18a by one (step S604), and the update completion notifier 16 determines whether or not the child replica number has become zero.

Then, in the case where the update completion notifier 16 determines the child replica number has become zero (Yes in step S605), the update completion notifier 16 requests the data updater 17 to update the replica (step S606).

Next, the update completion notifier 16 clears the update status of the status management table 18a (step S607), and determines whether or not a parent, which is a transmission origin of the Put request that has requested the completed update processing, is a client (step S608). Then, in the case where the parent is a client (Yes in step S608), the update completion notifier 16 requests the request issuer 19 to transmit the update completion notification to the client (step S609), and then terminates the processing.

In the case where the parent is not a client (No in step S608), the update completion notifier 16 identifies the node storing the parent replica (step S610), and requests the request issuer 19 to transmit the update completion notification to the identified node (step S611). Then, the update completion notifier 16 terminates the processing. In the case where the child replica number is not zero (No in step S605), the update completion notifier 16 terminates the processing.

Returning to FIG. 12, in the case where the update completion notifier 16 determines that the update failure flag has been set (Yes in step S603), the update completion notifier 16 decrements the child replica number of the update status in the status management table 18a by one (step S612), and the update completion notifier 16 determines whether or not the child replica number has become zero (step S613). Next, in the case where the update completion notifier 16 determines that the child replica number has become zero (Yes in step S613), the update completion notifier 16 determines whether or not a parent, which is a transmission origin of the Put request that has requested the failed update processing, is a client (step S614).

Then, in the case where the parent is a client (Yes in step S614), the update completion notifier 16 requests the request issuer 19 to transmit the update failure notification to the client (step S615), and then terminates the processing. In the case where the parent is not a client (No in step S614), the update completion notifier 16 identifies the node storing the parent replica (step S616), and then requests the request issuer 19 to transmit the update failure notification to the identified node (step S617). Then, the update completion notifier 16 terminates the processing. In the case where the child replica number is not zero (No in step S613), the update completion notifier 16 terminates the processing.

Advantageous Effects of the Node

As described above, the node 4 receives the Put request including the mark strength, which is priority of the update processing. Then, in the case where the node 4 is executing another update processing when the node 4 receives the Put request, the node 4 determines whether or not priority of the update processing requested by the newly received Put request is higher than priority of the update processing in preparation. For example, the node 4 determines that a time at which the newly received Put request is issued is earlier than a time at which the Put request that requested the update processing in preparation is issued.

Then, in the case where the node 4 determines that the priority of the update processing requested by the newly received Put request is higher than the priority of the update processing in preparation, the node 4 cancels the update processing in preparation, then forwarding the newly received Put request to other nodes 5 to 7. In view of this, the storage system 1 including the nodes 4 to 7 appropriately executes the Put request issued to any nodes 4 to 7.

In the case where the node 4 determines that the priority of the update processing requested by the newly received Put request is lower than the priority of the update processing in preparation, the node 4 transmits the update failure notification to the transmission origin of the Put request. In view of this, the storage system 1 including the nodes 4 to 7 preferentially executes the update processing with higher priority, and notifies the transmission origin of the Put request, which requests the update processing with lower priority, of failure of the Put request.

In the case where the node 4 receives the update failure notification from the node to which the Put request is forwarded, the node 4 cancels the execution of the update processing requested by the forwarded Put request, and forwards the update failure notification to a node or a client that has transmitted the Put request to the node 4. In view of this, the storage system 1 including the nodes 4 to 7 may proceed with the processing without execution of the failed update processing at the transmission destination of the Put request.

The node 4 stores the routing information 18b, which is stored in itself, in the Put request received from the client, and then forwards the Put request to the other nodes 5 to 7 in accordance with the route indicated by the routing information 18b. In the case where the node 4 forwards the Put request received from the other nodes 5 to 7, the node 4 forwards the Put request in accordance with the routing information in the Put request, that is, the routing information stored in the other nodes 5 to 7. In view of this, the storage system 1 including the nodes 4 to 7 determines a route that efficiently forwards the Put request to the respective nodes 4 to 7, which accept the Put request.

In the case where the node 4 receives the update completion notification from all nodes to which the node 4 forwards the Put request, the node 4 transmits the update completion notification to a client or another node that is the transmission origin of the Put request. In view of this, in the case where there is a plurality of routes to forward the Put request, that is, in the case where the route to transmit the Put request is a multipath, the storage system 1 including the nodes 4 to 7 executes the update processing while maintaining Strong Consistency.

In the case where the node 4 receives the update completion notification for the cancelled update processing from another node, the node 4 transmits the update failure notification to the transmission origin of the Put request that requests the cancelled update processing. In view of this, the node 4 coordinates update processings executed in the respective nodes 4 to 7 without forwarding the update completion notification of the update processing to be cancelled.

In the case where the node 4 receives the Put request during preparation of the update processing, the node 4 compares a time at which the Put request that requested the update processing in preparation was issued with a time at which the newly received Put request was issued, then executing the update processing requested by the Put request that was issued earlier. In view of this, in the case where installation location of the respective nodes 4 to 7 are distributed, the node 4 equally executes the update processings requested by the Put requests that are issued by the respective clients 2 and 3.

[b] Second Embodiment

In the second embodiment below, a node 4a that includes a status management table 18d that is different from the status management table 18a in the first embodiment will be described. First, the node 4a will be described using FIG. 15.

Figure 15:
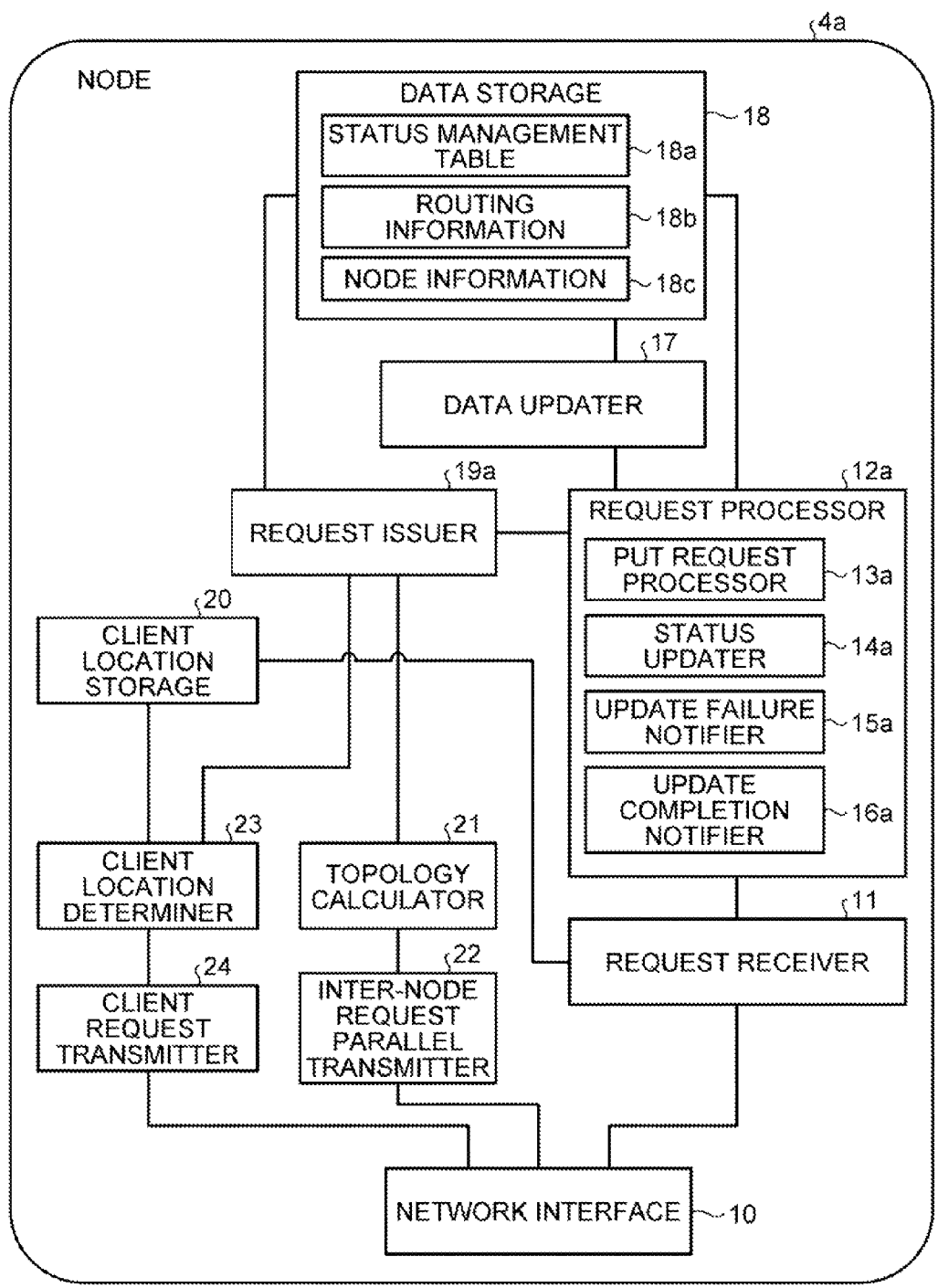
FIG. 15 is a block diagram illustrating a functional configuration of a node according to a second embodiment.

FIG. 15 is a block diagram illustrating a functional configuration of a node according to the second embodiment. In the example of FIG. 15, like reference numerals designate elements corresponding or identical to the respective units 10 to 24 in FIG. 2, and therefore such elements will not be further elaborated here.

In the example of FIG. 15, the node 4a includes a request processor 12a and a request issuer 19a. The request processor 12a includes a Put request processor 13a, a status updater 14a, an update failure notifier 15a, and an update completion notifier 16a. The node 4a stores the status management table 18d in the data storage 18.

FIG. 16 is a table illustrating the status management table according to the second embodiment. In the example of FIG. 16, the status management table 18d includes mark strength, a parent replica, a parent age, and a child replica number as an update status. An age of the node 4a is stored separately from the update status. In the case where a transmission origin of the Put request that requests update processing is a client, information indicative of the client is stored instead of the parent replica.

The age is information to determine whether or not update processing that is failed or completed in another node collides with another processing when the node 4a receives the update failure notification or the update completion notification from the other node. In the example of FIG. 16, the Put request, the update failure notification, and the update completion notification to be forwarded include the age information in addition to mark strength and routing information.

The Put request processor 13a executes a processing similar to the processing executed by the Put request processor 13. However, in the case where the mark strength of the newly received Put request is lower than the mark strength of the update status, the Put request processor 13a outputs information of the update status to the update failure notifier 15a. That is, the Put request processor 13a outputs information of the update request to be cancelled to the update failure notifier 15a. Then the Put request processor 13a outputs the newly received Put request to the status updater 14a.

The status updater 14a executes a processing similar to the processing executed by the status updater 14. In the case where the status updater 14a receives the Put request issued by the client to the node 4a, the status updater 14a stores an age "⊥" of the client with the Put request of the update status. Here, while the symbol "⊥" is indicative of the minimum value of the age, the minimum value of the age may employ another symbol.

The update failure notifier 15a executes a processing similar to the processing of the update failure notifier 15. However, in the case where the update failure notifier 15a is notified of information of the update status, that is, the mark strength, the parent replica, the parent age, the child replica number regarding the update processing to be cancelled, the update failure notifier 15a executes the following processing.

That is, the update failure notifier 15a requests the request issuer 19a to transmit the update failure notification to a node that stores the parent replica, or a client in the obtained update status. The update failure notifier 15a increments the age of the node 4a by one. In the case where the update failure notifier 15a receives the update failure notification, the update failure notifier 15a obtains the update status from the status management table 18d. Then, the update failure notifier 15a determines whether or not mark strength of the update failure notification accords with the mark strength of the update status. The update failure notifier 15a determines whether or not the age in the update failure notification accords with the current age in the status management table 18d.

Then, in the case where: the mark strength of the update failure notification accords with the mark strength of the update status; and the age of the update failure notification does not accord with the current age, the update failure notifier 15a clears the update status in order to cancel the update processing in preparation. That is, in the case where the update failure notifier 15a determines that the Put request forwarded by the node 4a collided with another Put request in another node and was not executed due to low priority, the update failure notifier 15a clears the update status to cancel the update processing in preparation.

Then, the update failure notifier 15a identifies a client or a node, which is a transmission origin of the Put request that has requested the cancelled update processing, and requests the request issuer 19a to transmit the update failure notification to the identified client or node. In the case where the update failure notifier 15a requests the request issuer 19a to transmit the update failure notification, the update failure notifier 15a outputs the age in the Put request, that is, the age of the parent that is the transmission origin of the Put request. In the case where the update failure notifier 15a requests the request issuer 19a to forward the update failure notification, the update failure notifier 15a outputs the age of the parent of the update status to be cleared.

In the case where the update completion notifier 16a obtains the update completion notification, the update completion notifier 16a obtains the update status from the status management table 18d, and determines whether or not: the mark strength of the update completion notification accords with the mark strength of the update status; and the age of the update completion notification accords with the current age. Then, the update completion notifier 16a obtains the update status from the status management table 18d. In the case where: the mark strength of the update completion notification accords with the mark strength of the update status; and the age of the update completion notification accords with the current age, the update completion notifier 16a executes the following processing.

First, the update completion notifier 16a decrements the child replica number of the update status by one. Next, the update completion notifier 16a determines whether or not the child replica number of the update status has become zero. That is, the update completion notifier 16a determines whether or not the update completion notifier 16a receives the update completion notifications where the according mark strength and age from all nodes to which the Put request is forwarded. Then, in the case where the child replica number of the update status has become zero, the update completion notifier 16a updates the replica and clears the update status.

The update completion notifier 16a identifies a client or a node that is a transmission origin of the Put request requesting the executed update processing, and then requests the request issuer 19a to transmit the update completion notification to the identified client or node. In the case where the update completion notifier 16a requests the request issuer 19a to transmit the update completion notification, the update completion notifier 16a outputs the age in the Put request, that is, the age of the parent that is the transmission origin of the Put request. In the case where the update completion notifier 16a requests the request issuer 19a to forward the update failure notification or the update completion notification, the update completion notifier 16a outputs the age of the parent included in the update status to be cleared.

The request issuer 19a executes a processing similar to that of the request issuer 19. In the case where the request issuer 19a is requested to transmit the update failure notification by the update failure notifier 15a or the update completion notifier 16a, the request issuer 19a executes the following processing. That is, the request issuer 19a receives the age of the parent of the update status to be cleared along with the request to transmit the update failure notification, and then stores the obtained age of the parent in the update failure notification.

In the case where the request issuer 19a transmits the Put request, the request issuer 19a refers the status management table 18d so as to obtain the update status. Then, the request issuer 19a stores the obtained current age, which is included in the status management table 18d, in the Put request, then transmitting this Put request.

In the case where the request issuer 19a generates the update completion notification or the update failure notification, the request issuer 19a stores the age in the Put request that has requested the update processing, that is, the age of the parent node. In the case where the request issuer 19a forwards the update completion notification or the update failure notification, the request issuer 19a stores an age notified by the update failure notifier 15a or the update completion notifier 16a.

In the case where the node 4a forwards the Put request received from the client 2, the node 4a stores the current age in the Put request, then forwarding it. In the case where: the node 4a is not a terminating end; and the Put request received from another node has a higher priority, the node 4a assigns the age in the received Put request to the current age, that is, the age of the node 4a itself.

In the case where the node 4a has cancelled the update processing with lower priority, the node 4a stores the age of the Put request that has requested the cancelled update processing, that is, the age of the parent node in the update failure notification. Then, the node 4a transmits this update failure notification to the parent node. In the case where the node 4a transmits the update failure notification, the node 4a increments the current age by one. Then, the node 4a stores the current age in the Put request that has requested the update processing with higher priority, thus forwarding the Put request to a node storing the child replica.

In the case where: the node 4a itself is the terminating end; and the update processing indicated by the received Put request has higher priority, the node 4a updates data of the replica and transmits the update completion notification storing the age of the parent node to the parent node. In the case where the node 4a updates the data of the replica, the node 4a stores the age of the parent the node in the update completion notification. Then, the node 4a transmits this update completion notification to the parent node.

In view of this, the node 4a receives the update completion notification that stores the same age as the current age only in the case where: the update processing indicated by the Put request that the node 4a has transmitted is executed in all child nodes; and the update processing in preparation has a higher priority in the node 4a. On the other hand, in the case where the priority of the update processing has become lower between transmission of the Put request and reception of the update completion notification, the node 4a receives the update completion notification storing the age that is different from the current age. Thus, the node 4a does not execute the update processing of the replica. As a result, the node 4a appropriately executes the Put request issued by any node.

Figure 17:
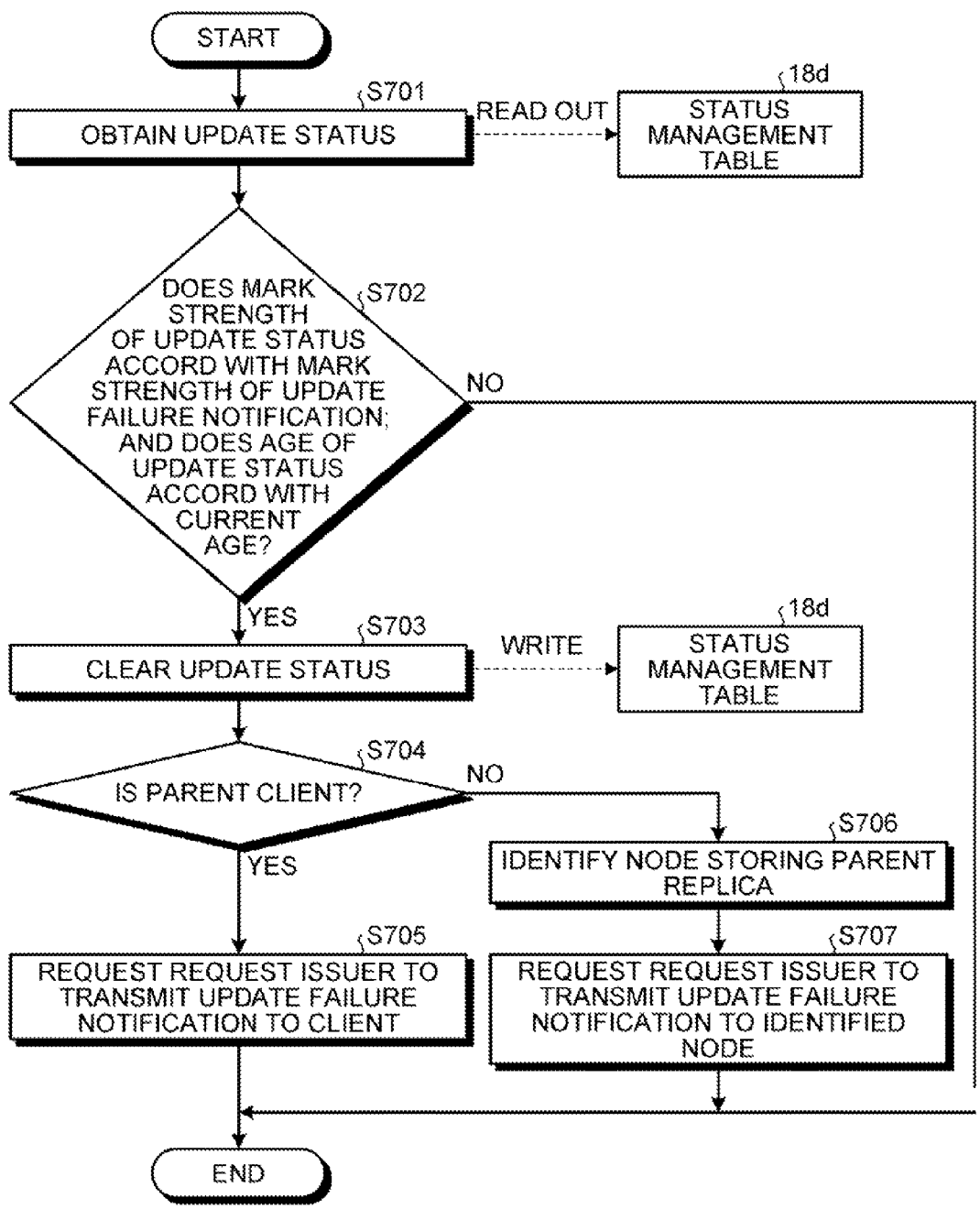
FIG. 17 is a flowchart of a processing when an update failure notifier obtains an update failure notification according to the second embodiment.

Next, a flow of the processing executed by the update failure notifier 15a according to the second embodiment when obtaining the update failure notification will be described using FIG. 17. FIG. 17 is a flowchart of the processing executed when the update failure notifier obtains the update failure notification according to the second embodiment. In the example of FIG. 17, the update failure notifier 15a executes the processing triggered by obtaining the update failure notification.

First, the update failure notifier 15a obtains the update status from the status management table 18d (step S701). Next, the update failure notifier 15a determines whether or not: mark strength of the update status accords with mark strength of the update failure notification; and age of the update status accords with the current age (step S702).

Then, in the case where the respective mark strengths do not accord with one another, and the respective ages do not accord with one another (No in step S702), the update failure notifier 15a terminates the processing. On the other hand, in the case where the update failure notifier 15a determines that the respective mark strengths accord with one another while the respective ages accord with one another (Yes in step S702), the update failure notifier 15a clears the update status of the status management table 18d (step S703).

The update failure notifier 15a determines whether or not the parent is a client in the update processing indicated by the cleared update status (step S704). Then, in the case where the update failure notifier 15a determines that the parent is a client (Yes in step S704), the update failure notifier 15a requests the request issuer 19a to transmit the update failure notification to the client (step S705), and then terminates the processing.

On the other hand, in the case where the update failure notifier 15a determines that the parent is not a client (No in step S704), the update failure notifier 15a identifies a node storing the parent replica (step S706). Then, the update failure notifier 15a requests the request issuer 19a to transmit the update failure notification to the identified node (step S707), and then terminates the processing.

Figure 18:
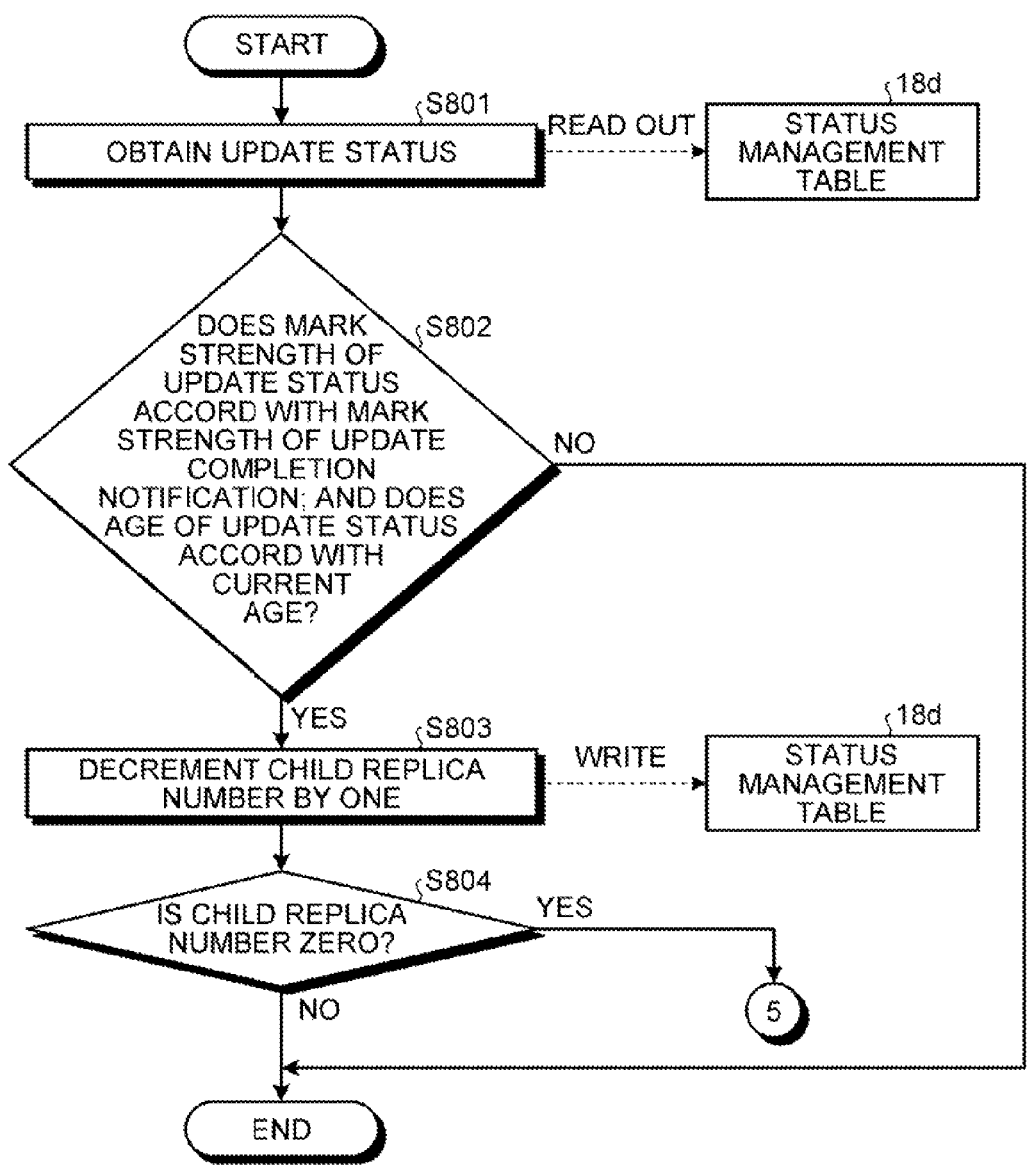
FIG. 18 is a first flowchart of a processing when an update completion notifier obtains an update completion notification according to the second embodiment.
Figure 19:
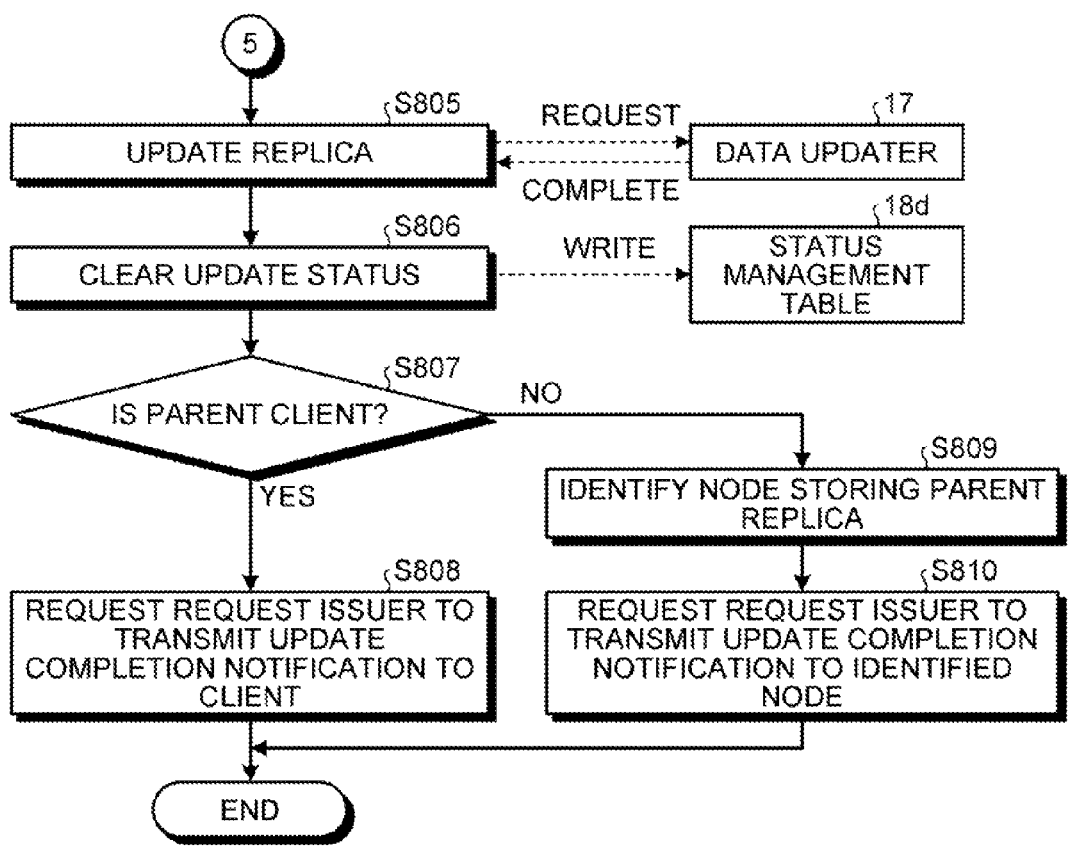
FIG. 19 is a second flowchart of a processing when an update completion notifier obtains an update completion notification according to the second embodiment.

Next, a flow of the processing executed by the update completion notifier 16a when obtaining the update completion notification will be described using FIGS. 18 and 19. FIG. 18 is a first flowchart of the processing executed when the update completion notifier obtains the update completion notification according to the second embodiment. FIG. 19 is a second flowchart of the processing executed when the update completion notifier obtains the update completion notification according to the second embodiment.

In the example of FIG. 18, the update completion notifier 16a executes the processing triggered by obtaining the update completion notification. First, the update completion notifier 16a obtains the update status from the status management table 18d (step S801). Next, the update completion notifier 16a determines whether or not: mark strength of the update status accords with mark strength of the update completion notification; and age of the update status accords with the current age (step S802). Then, in the case where: the mark strength of the update status accords with the mark strength of the update completion notification; and the age of the update status does not accord with the current age (No in step S802), the update completion notifier 16a terminates the processing.

Then, in the case where the update completion notifier 16a determines that: the respective mark strengths accord with one another; and the respective ages accord with one another (Yes in step S802), the update completion notifier 16a decrements the child replica number of the update status in the status management table 18d by one (step S803). Next, the update completion notifier 16a determines whether or not the child replica number is zero (step S804). In the case where the child replica number is not zero (No in step S804), the update completion notifier 16a terminates the processing. On the other hand, in the case where the child replica number is zero (Yes in step S804), the update completion notifier 16a executes the processing illustrated in FIG. 19.

First, the update completion notifier 16a requests the data updater 17 to update the replica (step S805). Next, the update completion notifier 16a clears the update status in the status management table 18d (step S806). Then, the update completion notifier 16a determines whether or not the parent is a client in the update processing indicated by the cleared update status (step S807).

Then, in the case where the update completion notifier 16a determines that the parent is a client (Yes in step S807), the update completion notifier 16a requests the request issuer 19a to transmit the update completion notification to the client (step S808), and then terminates the processing. On the other hand, in the case where the update completion notifier 16a determines that the parent is not a client (No in step S807), the update completion notifier 16a identifies a node storing the parent replica (step S809). Then, the update completion notifier 16a requests the request issuer 19a to transmit the update completion notification to the identified node (step S810), and then terminates the processing.

Advantageous Effects of the Node 4a

As described above, the node 4a determines whether or not the age of the update completion notification or the update failure notification accords with the current age, so as to determine whether or not the processing has lower priority in the node storing the child replica without the status management table 18d including the cancellation table. In view of this, the node 4a appropriately executes the update processing indicated by a plurality of Put request issued to any nodes without the cancellation table.

The node 4a does not include the cancellation table in the status management table 18d, thus ensuring the reduced size of the status management table 18d. This eliminates the need for the node 4a to operate on each entry in the cancellation table, thus saving cost of the processing.

In the case where the current age is different from the age of the update completion notification, the node 4a immediately transmits the update failure notification to the node storing the parent replica and the client. This allows the node 4a to quickly transmit the result of the Put request to the clients 2 and 3.

[c] Third Embodiment

While the embodiments of the present invention have been described above, any other embodiment is possible. Therefore, another embodiment according to the present invention will be described below as a third embodiment.

1. Priority

The above-described node 4 and node 4a each employ a time, at which the Put request was issued, as the mark strength, and execute the update processing that is requested by the Put request issued earlier. However, this embodiment is not limited to this.

For example, the nodes 4 and 4a may execute the update processing that is requested by the Put request issued later. That is, the nodes 4 and 4a compare mark strength of the update request in preparation with the mark strength of the newly received Put request. Then, the nodes 4 and 4a may execute the update request that is requested by the Put request including the mark strength indicative of the later time.

This processing allows the nodes 4 and 4a to execute lazy update processing, for example, in the case where data of the replica is data to apply latest update only, thus ensuring the reduced number of updates.

The nodes 4 and 4a may employ a plurality of mark strengths. For example, the nodes 4 and 4a store a unique value corresponding to a node that receives the Put request from the client 2 or 3 in addition to the time at which the Put request was issued. Then, the nodes 4 and 4a compare mark strength of the Put request according to the update request in preparation with the mark strength of the newly received Put request. In the case where the times are identical, the nodes 4 and 4a may determine the update request to execute corresponding to the node that has received the Put request. Execution of this processing allows applying the present invention to the nodes 4 and 4a even with an insufficient time accuracy measured by the client.

The nodes 4 and 4a may employ a time at which the node received the Put request as the mark strength. Generally, times of the respective nodes in the storage system accurately accord with one another. This mark strength allows execution of the processing with higher reliability.

The nodes 4 and 4a may determine an update processing to execute corresponding to a user that has issued the Put request. The nodes 4 and 4a may determine an update processing to execute corresponding to a size of data targeted for the update processing. For example, the nodes 4 and 4a may preferentially execute the update processing on data with a smaller size. That is, ensuring a storage area for the data in smaller size is known to be easier from experience. This decreases the whole latency of the storage system 1.

2. Number of Nodes and Routing Information

While the above storage system 1 includes the nodes 4 to 7, the embodiment is not limited to this. The storage system 1 may include any number of nodes. While the respective nodes 4 to 7 store replicas of the same data, the embodiment is not limited to this. For example, assume that the nodes 4 to 6 store replicas of data A, and the nodes 3 to 7 store replicas of data B. In this case, the respective nodes 4 to 7 each include routing information for each replica. In the case where the respective nodes 4 to 7 store the routing information correspond to data targeted for the Put request, the respective nodes 4 to 7 appropriately execute the Put request issued by any node.

The above routing information is an example. Any format of the routing information may be employed insofar as the routing information specifies the route to forward the Put request. For example, in the case where the data of the replicas stored in the respective nodes is fixed and does not move, the routing information may include information indicative of not a replica but a node to be the forwarding destination of the Put request.

3. Each Piece of Information

The above nodes 4 and 4a store the routing information, the age, and the mark strength in the Put request, the update failure notification, or the update completion notification and then transmit it. However, the embodiment is not limited to this. For example, the nodes 4 and 4a may transmit the routing information, the age, the mark strength and the like along with the Put request.

4. Program

Figure 20:
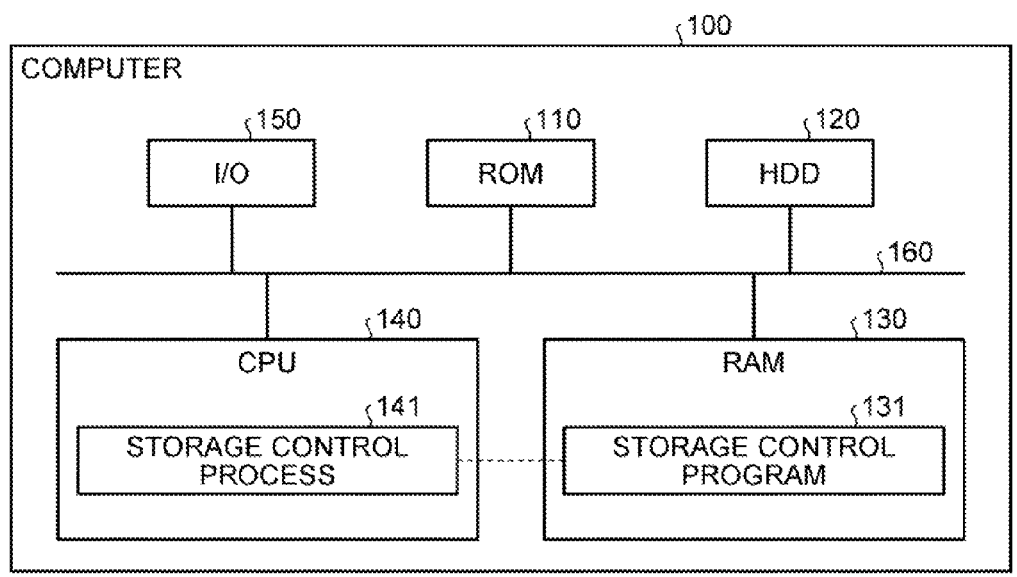
FIG. 20 is a block diagram illustrating an exemplary computer that executes a storage control program.
Figure 21:
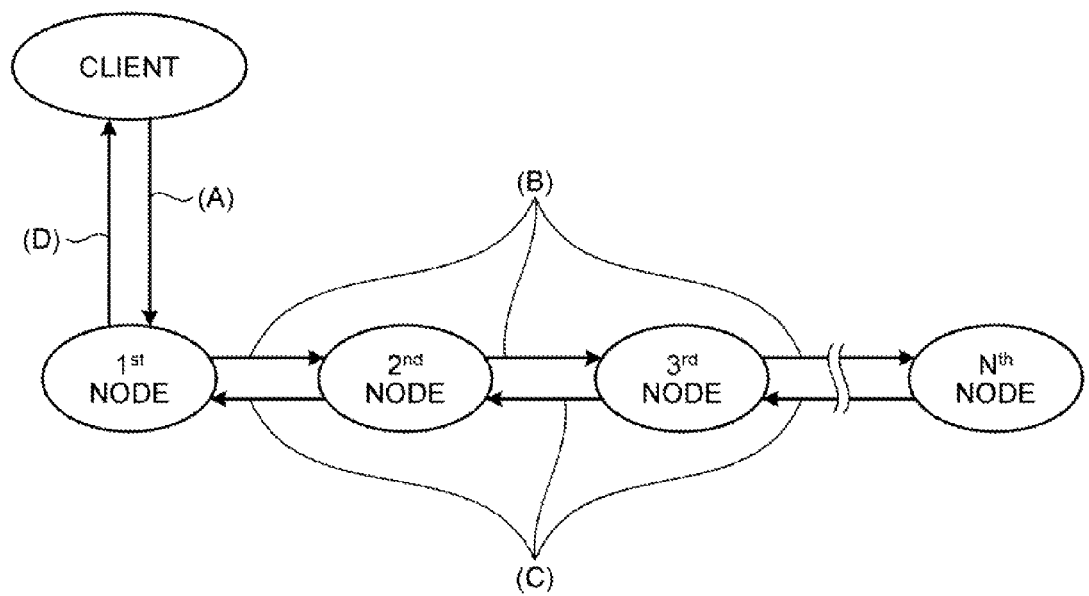
FIG. 21 is a block diagram illustrating an exemplary chain replication.
Figure 22:
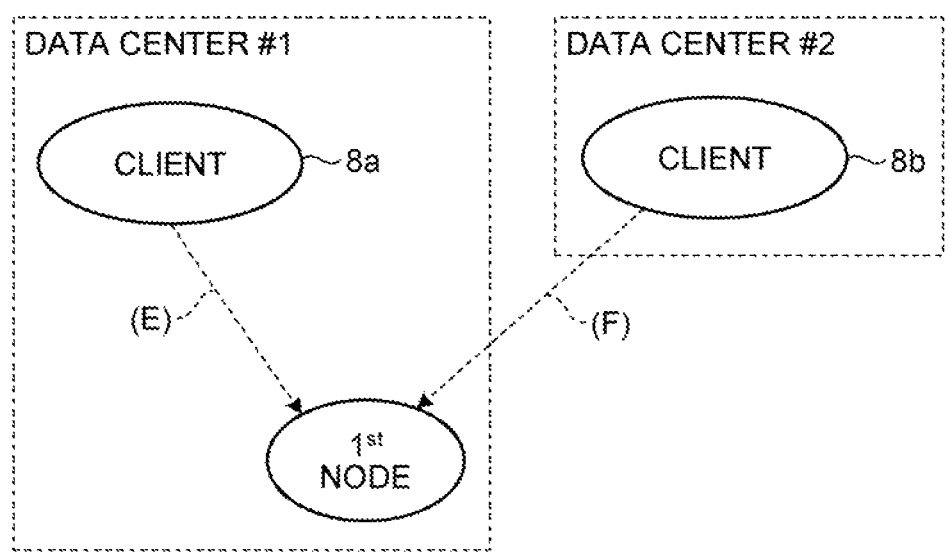
FIG. 22 is a block diagram illustrating a timing at which a received Put request is processed.

The first and second embodiments have described that the nodes 4 and 4a use hardware to achieve various processings. However, the embodiment is not limited to this. A preliminarily prepared program may be executed by a computer that operates as a storage device. Therefore, an exemplary computer that executes a program with a similar function to that of the node 4 in the first embodiment will be described below using FIG. 20. FIG. 20 is a block diagram illustrating the exemplary computer that executes a storage control program.

An exemplary computer 100 illustrated in FIG. 20 includes a Read Only Memory (ROM) 110, a Hard Disk Drive (HDD) 120, a Random Access Memory (RAM) 130, and a Central Processing Unit (CPU) 140, which are coupled to one another through a bus 160. The computer 100 also includes an Input Output (I/O) 150, which is coupled through the bus 160, to communicate with another computer.

The HDD 120 stores an ordinary replica, the status management table 18a, the routing information 18b, and the node information 18c. The RAM 130 stores a storage control program 131. The storage control program 131 is read and executed by CPU 140 so as to function as a storage control process 141 in the example illustrated in FIG. 20. The storage control process 141 provides a function similar to that of the node 4 in FIG. 2. The storage control process 141 is also able to provide a function similar to the node 4a in FIG. 15.

The system control program in this embodiment is achieved, for example, using a preliminarily prepared program executed by a computer such as a personal computer and a workstation. This program may be distributed through a network such as the Internet. This program is recorded in a recordable media such as a hard disk, a flexible disk (FD), a CD-ROM (Compact Disc Read Only Memory), a MO (Magneto Optical Disc), and a DVD (Digital Versatile Disc), which are computer-readable. The program may be read out from the recordable media and executed by the computer.

An aspect of this application appropriately executes a Put request issued to any node.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device being one of a plurality of storage devices storing data, the storage device comprising:
   a memory; and
   a processor coupled to the memory, wherein the processor executes a process comprising:
   receiving a request for an update processing of the data and a priority information indicating a priority of the update processing;
   storing the request for an update processing and the priority of the request;
   determining, when having received a new request and a new priority information during a preparation for an execution of update processing corresponding to another request stored at the storing, whether or not a new priority indicated by the new priority information is higher than a priority of the update processing in the preparation;
   canceling the update processing in the preparation when having determined at the determining that the new priority is higher than the priority of the update processing in the preparation;
   forwarding the new request and the new priority information to another storage device storing the data when having determined at the determining that the new priority is higher than the priority of the update processing in the preparation;
   forwarding a response indicative of failure of the update processing to a transmission origin of the new request when having determined at the determining that the new priority is lower than the priority of the update processing in the preparation;
   canceling the update processing when the response indicative of failure of the update processing was received from the other storage device, and forwarding the response indicative of failure of the update processing to a transmission origin of the new request when the response indicative of failure of the update processing was received from the other storage device.

2. The storage device according to claim 1, wherein the process further comprises storing route information of a route connecting a plurality of storage devices storing the data, wherein
the forwarding includes forwarding the route information stored at the storing along with the request and the priority information received from a client, and forwarding the request, the priority information, and the route information received from the other storage device in accordance with a route indicated by the route information received from the other storage device.

3. The storage device according to claim 2, wherein the process further comprises executing the update processing in the preparation when having received a response indicative of completion of the update processing from all the storage devices being destinations of the request forwarded at the forwarding; wherein
the forwarding includes forwarding the response to a transmission origin of the request when having received the response from all the storage devices being destinations of the request forwarded at the forwarding.

4. The storage device according to claim 2, wherein the forwarding includes transmitting a response indicative of failure of the update processing to a transmission origin of the request when having received at the receiving a response indicative of completion of the update processing from another storage device for the cancelled update processing at the canceling.

5. The storage device according to claim 1, wherein the receiving includes receiving a time of the update request being issued by the client as the priority information, and
the determining includes determining that a new priority indicated by the new priority information is higher than the priority of the update processing in the preparation when a time received as the new priority information is earlier than a time received with the request of the update processing in the preparation.

6. A non-transitory computer-readable recording medium having stored therein a program for causing a computer, being one of a plurality of computers, to execute a storage control process comprising:
receiving a request for an update processing of the data and a priority information indicating a priority of the update processing;
storing the request for an update processing and the priority of the request;
determining, when having received a new request and a new priority information during a preparation for an execution of update processing corresponding to another request stored at the storing, whether or not a new priority indicated by the new priority information is higher than a priority of the update processing in the preparation;
canceling the update processing in the preparation when having determined at the determining that the new priority is higher than the priority of the update processing in the preparation;
forwarding the new request and the new priority information to another computer storing the data when having determined at the determining that the new priority is higher than the priority of the update processing in the preparation;
forwarding a response indicative of failure of the update processing to a transmission origin of the new request when having determined at the determining that the new priority is lower than the priority of the update processing in the preparation;
canceling the update processing when the response indicative of failure of the update processing was received from the other storage device, and
forwarding the response indicative of failure of the update processing to a transmission origin of the new request when the response indicative of failure of the update processing was received from the other storage device.

7. A storage control method executed by a storage device, being one of a plurality of storage device, the storage control method comprising:
receiving a request for an update processing of the data and a priority information indicating a priority of the update processing;
storing the request for an update processing and the priority of the request;
determining, when having received a new request and a new priority information during a preparation for an execution of update processing corresponding to another request stored at the storing, whether or not a new priority indicated by the new priority information is higher than a priority of the update processing in the preparation;
canceling the update processing in the preparation when having determined at the determining that the new priority is higher than the priority of the update processing in the preparation;
forwarding the new request and the new priority information to another storage device storing the data when having determined at the determining that the new priority is higher than the priority of the update processing in the preparation;
forwarding a response indicative of failure of the update processing to a transmission origin of the new request when having determined at the determining that the new priority is lower than the priority of the update processing in the preparation;
canceling the update processing when the response indicative of failure of the update processing was received from the other storage device, and
forwarding the response indicative of failure of the update processing to a transmission origin of the new request when the response indicative of failure of the update processing was received from the other storage device.

\* \* \* \* \*